(12) United States Patent
Prendergast

(10) Patent No.: US 6,457,179 B1
(45) Date of Patent: Oct. 1, 2002

(54) HELMET MOUNT FOR NIGHT VISION DEVICE

(75) Inventor: Jonathan R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 0 days.

(21) Appl. No.: 09/755,841

(22) Filed: Jan. 5, 2001

(51) Int. Cl.⁷ .................................................. A42B 3/00
(52) U.S. Cl. ................................ 2/6.2; 2/422; 403/330
(58) Field of Search ............................... 2/6.2, 6.3, 6.5, 2/6.7, 422; 359/409, 815, 630; 224/909; 403/330, DIG. 3, DIG. 4

(56) References Cited

U.S. PATENT DOCUMENTS

| | | | |
|---|---|---|---|
| 1,226,101 A | * 5/1917 | Marsden | |
| 2,284,180 A | * 5/1942 | Thomas | |
| 4,449,787 A | 5/1984 | Burbo et al. | 350/538 |
| 4,553,873 A | * 11/1985 | Salice | |
| 4,689,834 A | 9/1987 | McCarthy et al. | 2/422 |
| 4,697,783 A | * 10/1987 | Kastendieck et al. | |
| 4,987,608 A | * 1/1991 | Cobb | |
| 5,176,342 A | 1/1993 | Schmidt et al. | 244/122 AE |
| 5,179,735 A | * 1/1993 | Thomanek | |
| 5,226,181 A | 7/1993 | Polednak et al. | 2/422 |
| 5,331,684 A | 7/1994 | Baril et al. | 2/6.2 |
| 5,339,464 A | * 8/1994 | Dor | |
| 5,347,119 A | 9/1994 | Connors | 250/214 VT |
| 5,408,086 A | 4/1995 | Morris et al. | 250/214 VT |
| 5,467,479 A | 11/1995 | Mattes | 2/6.3 |
| 5,469,578 A | 11/1995 | Mattes | 2/6.7 |
| 5,471,678 A | 12/1995 | Dor | 2/6.7 |
| 5,506,730 A | 4/1996 | Morley et al. | 359/815 |
| 5,542,627 A | 8/1996 | Crenshaw et al. | 244/121 |
| 5,581,806 A | * 12/1996 | Capdepuy et al. | |
| 5,648,862 A | 7/1997 | Owen | 359/153 |
| 5,703,354 A | 12/1997 | Wannagot et al. | 250/214 VT |
| 5,914,816 A | 6/1999 | Soto et al. | 359/630 |

FOREIGN PATENT DOCUMENTS

WO        9322946     * 11/1993

* cited by examiner

Primary Examiner—Rodney M. Lindsey
(74) Attorney, Agent, or Firm—Christie, Parker & Hale, LLP

(57) ABSTRACT

A helmet mount for a night vision device with a goggle horn for attachment to the helmet mount is disclosed. The helmet mount includes an adjustable socket assembly for mounting goggle horns with varying dimensions therein, and a break away latch assembly in the lower socket that allows a goggle horn to be removed if a certain predetermined force is applied to the night vision device. Additionally, the helmet mount includes a vertical adjustment system for changing the vertical position of the night vision device relative to the user's eyes. The vertical movement can be achieved by either a rack/pin system or a gear drive system. Also provided is a locking mechanism that allows the night vision device to be easily changed from the stowed or in use position by compressing an activation button that disengages the locking mechanism and allows the night vision to be flipped up or down. The vertical adjustment systems and locking mechanism are designed to allow for one-handed operation by the user of the night vision device.

20 Claims, 24 Drawing Sheets

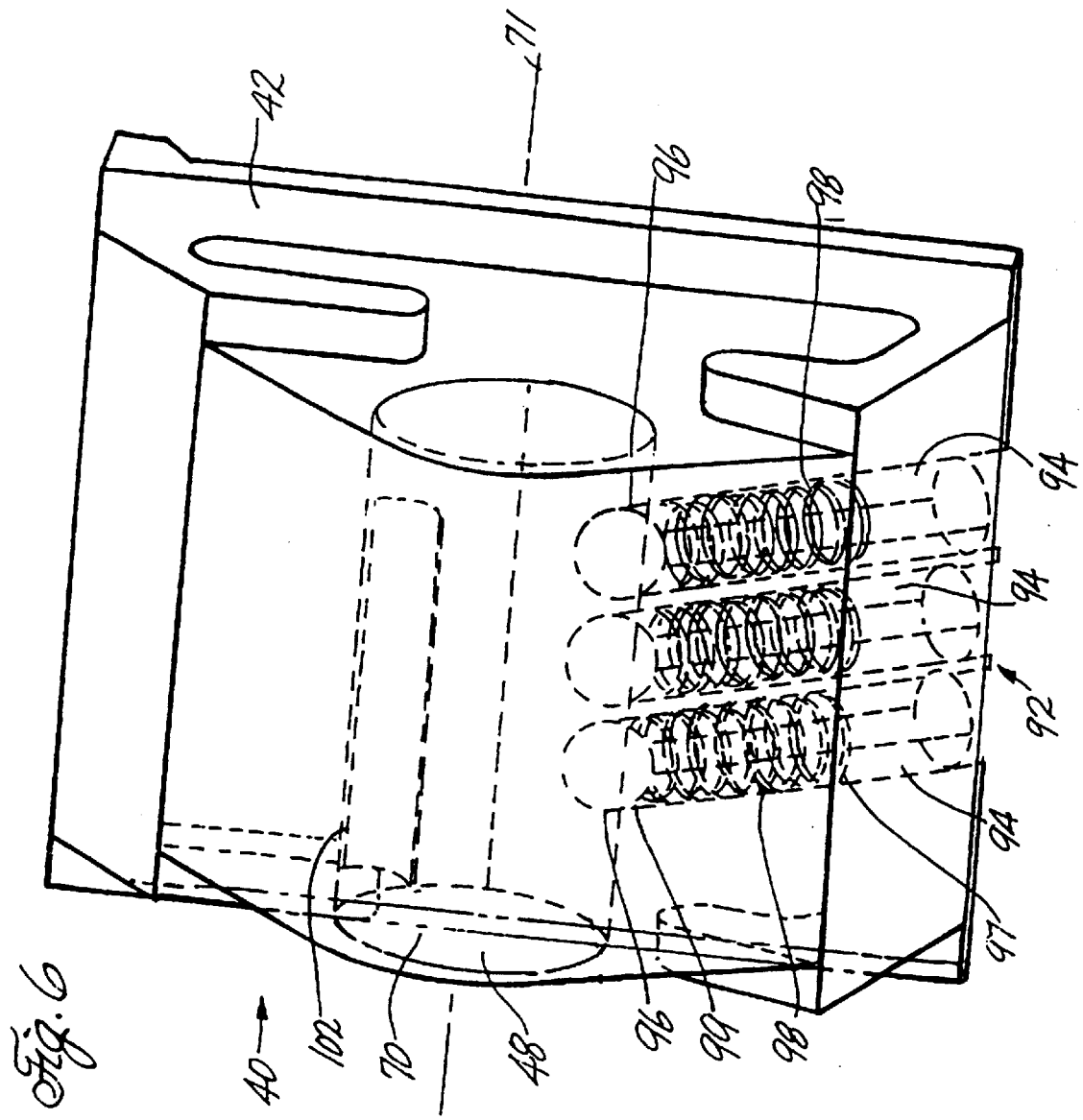

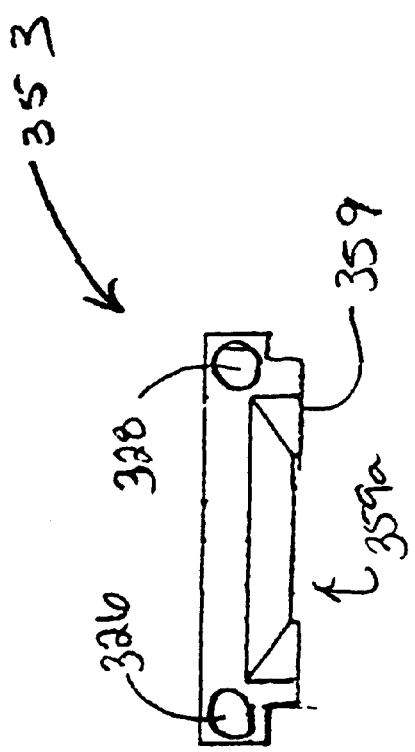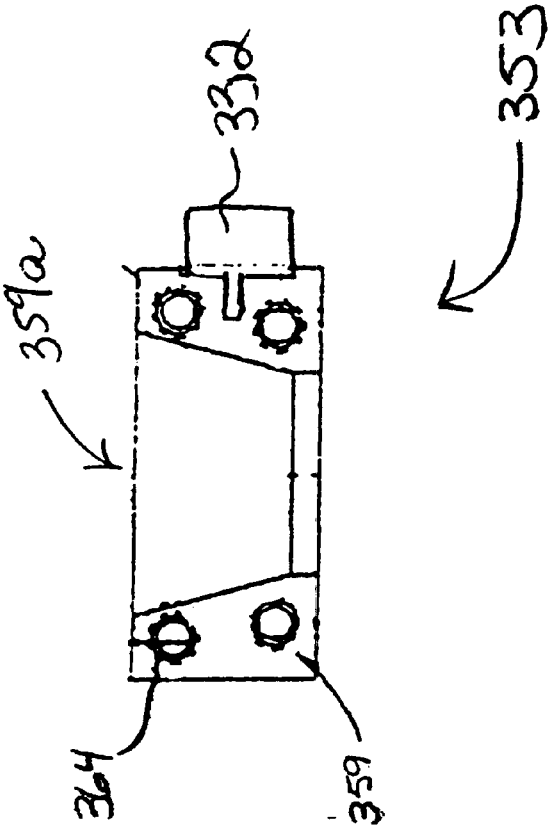

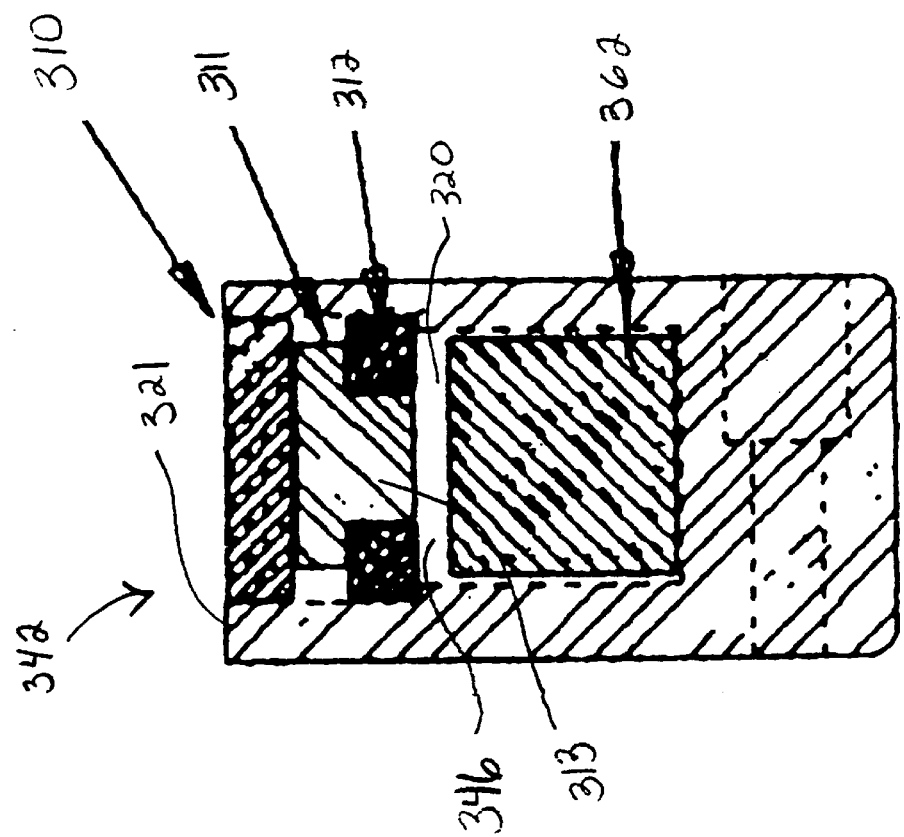
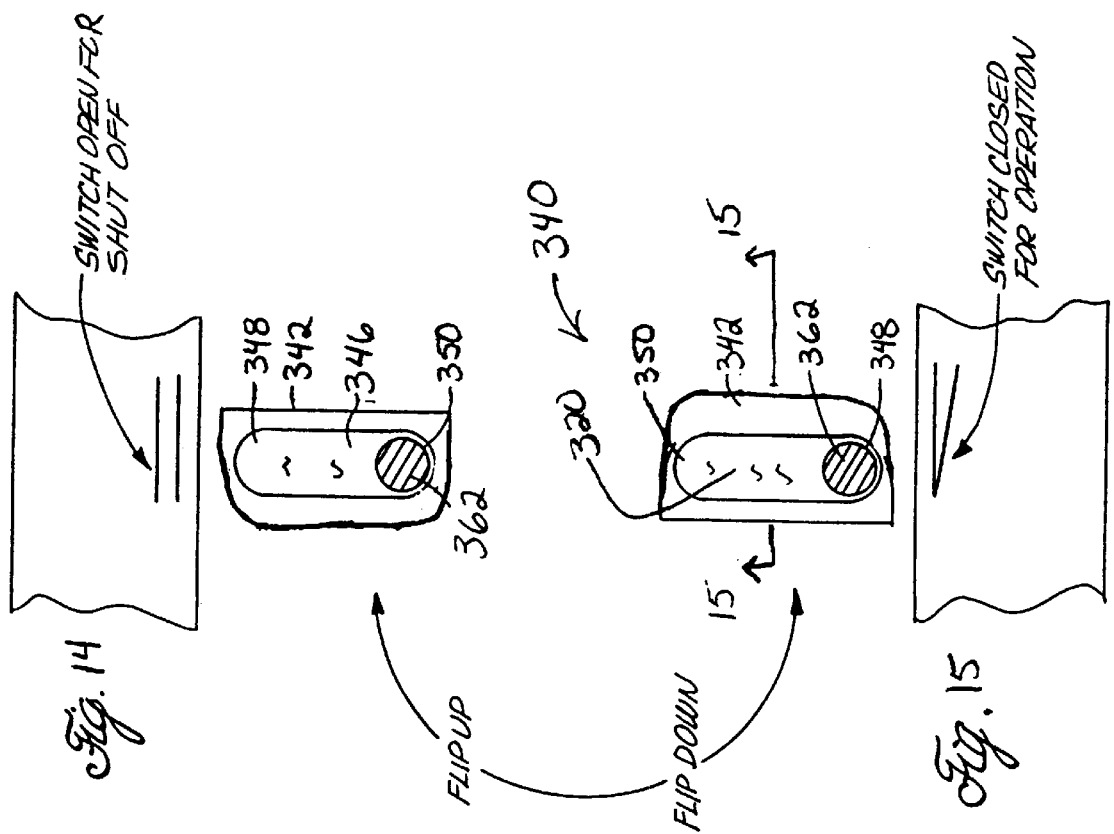

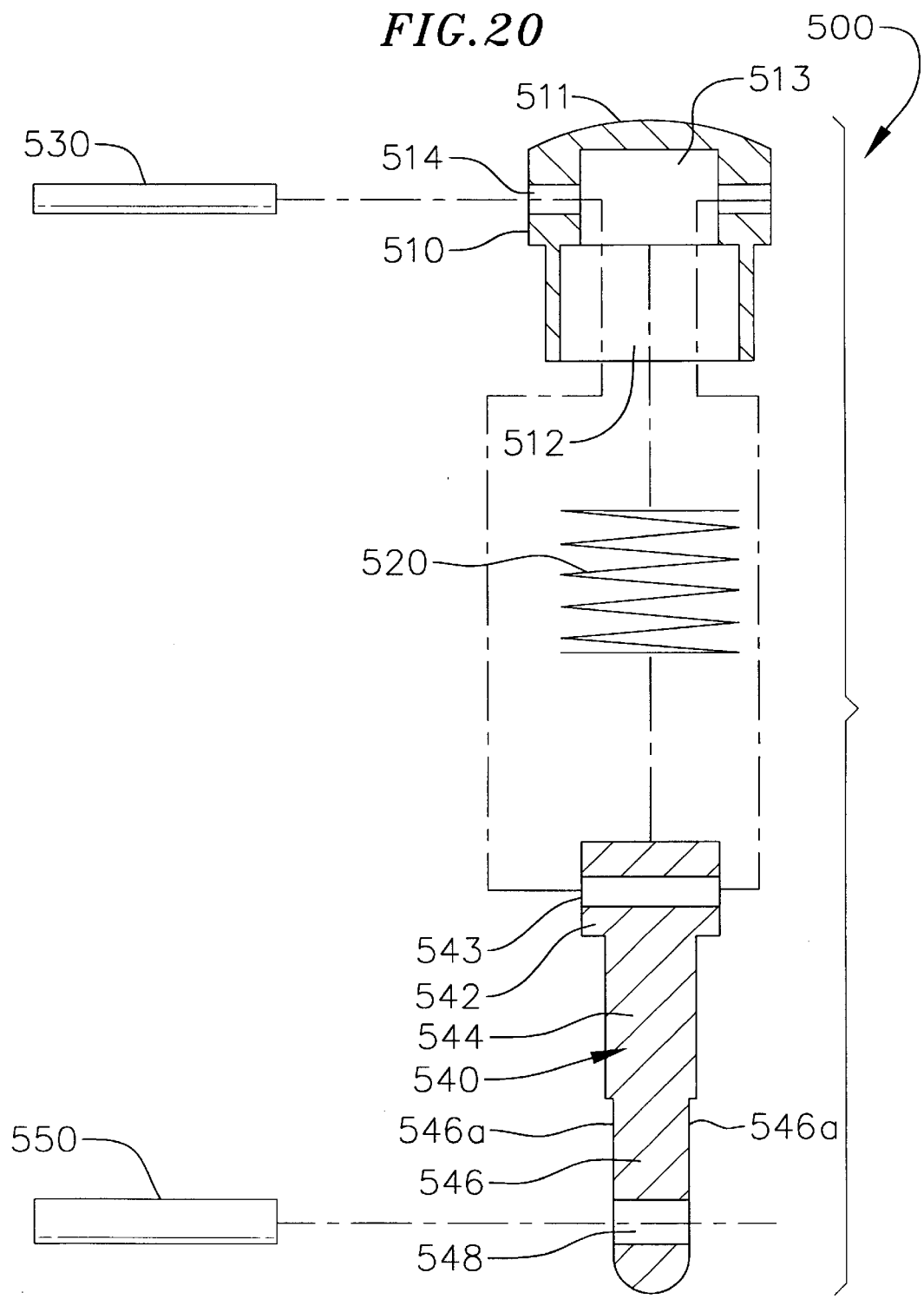

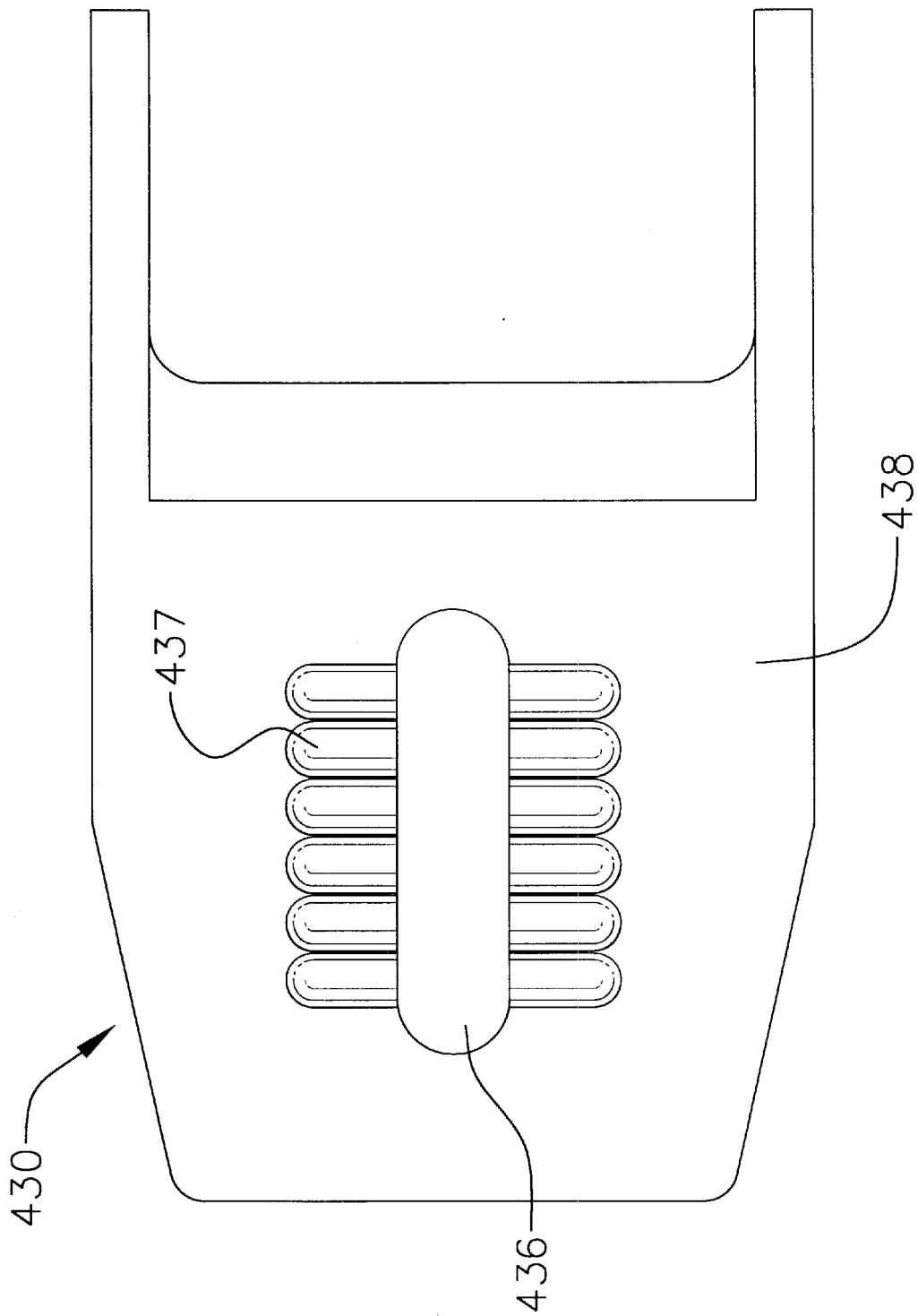

*FIG.26a* *FIG.26b*
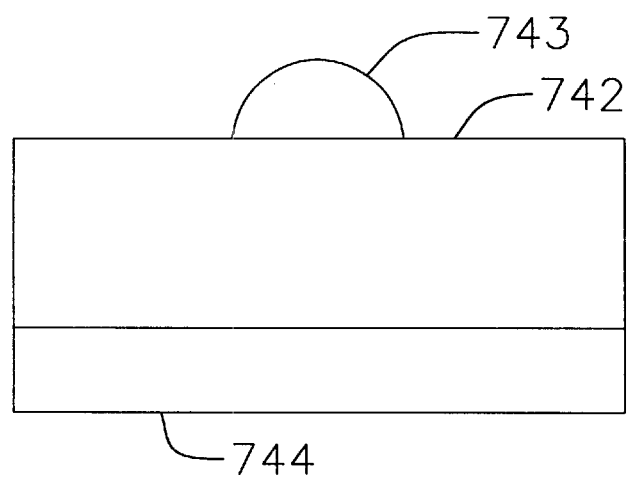
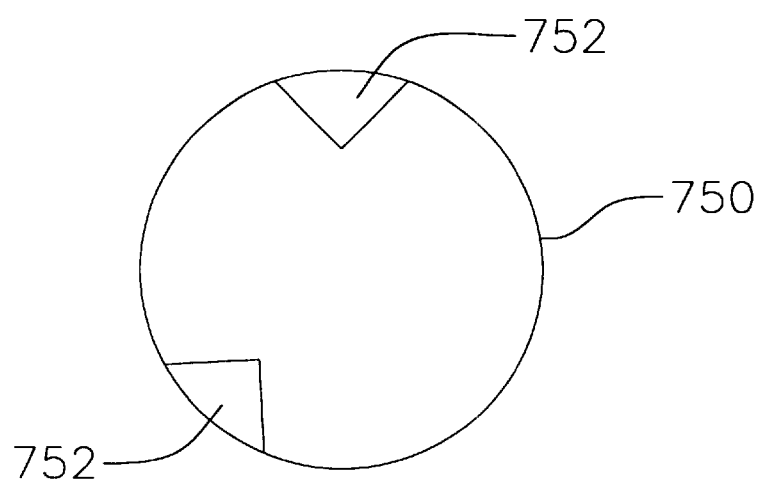
*FIG.26c*

HELMET MOUNT FOR NIGHT VISION DEVICE

FIELD OF THE INVENTION

This invention relates generally to mounting assemblies for night vision devices, and more particularly to a flip-up helmet mount for night vision devices that includes an adjustable socket assembly for mounting the goggles to the helmet mount, a break away latch assembly, automatic shutdown assemblies, position adjustment, tilt adjustment, focal adjustment, vertical adjustment, and a locking mechanism, wherein the adjustment mechanisms are designed to allow for one-handed operation by the user of the night vision device.

BACKGROUND OF THE INVENTION

Night vision devices are commonly used by military personnel for conducting operations in low light or night conditions. The night vision devices utilized by the military typically include image intensifier tubes and associated optics that convert infrared and near infrared light into viewable images. A common night vision device currently being used in the U.S. Army is the PVS7 night vision device, manufactured by ITT Corporation in Roanoke, Va.

Assemblies for mounting night vision devices to a helmet are well known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

A known mounting assembly for night vision devices encompasses a flip-up helmet mount that attempts to provide all of the features identified above. However, that device is believed to be deficient in its operational aspects because, among other reasons, the flip-up helmet mount is not designed for one-handed operation. More particularly, the tilt adjustment means disclosed requires a user to loosen a locking knob with one hand, while at the same time repositioning the night vision device with the other hand. Obviously, given the conditions under which night vision devices are typically used, it is undesirable and potentially unsafe for adjustment of the night vision device to occupy both hands of the operator. If both hands of the operator are required to adjust the night vision device, then the operator will be unable to continue carrying a weapon or other equipment in one of his hands. It can certainly be appreciated that having to put down one's weapon in order to adjust the night vision device may expose the operator of the night vision device to certain unnecessary risks.

Known flip-up helmet mounts are also deficient in operational aspects because of jamming susceptibility of the automatic shutdown assembly. The automatic shutdown assembly includes a magnet housing having an S-shape or question-mark shape. A combination of an S-shaped cavity for movement of a relatively long, narrow bar magnet within results in an automatic shutdown assembly with questionable reliability. Specifically, the long, narrow bar magnet can easily become askew within the S-shaped cavity as the magnet moves within the cavity. When the magnet becomes askew within the cavity, the automatic shutdown assembly becomes jammed and the night vision device does not automatically turn off when rotated into the stowed position. This is obviously undesirable since the phosphor yellow/green light emitted from the night vision device would then be visible to possibly hostile personnel in front of the operator.

Known flip-up helmet mounts are inadequate for the conditions in which the night vision devices are typically used. For example, when the helmet mount is moved from one position to another, the magnet in the automatic shutdown assembly produces a significant amount of noise upon contacting the end of the cavity. Obviously, excessive noise can draw unwanted attention to the operator of the night vision device. It is also important that the automatic shutdown assembly not intermittently turn the goggles off in use or on while not in use due to inadvertent movement of the magnet caused by movement of a person wearing the goggles. In another known flip-up helmet mount, a significant amount of noise is produced by a rib that is received into one of two grooves for retaining the night vision device in either the use or the stowed position.

Further, the focal adjustment assembly of the known mount requires the operator of the night vision device to apply force inwardly to a pair of release buttons in order to adjust the location of the night vision device relative to his eyes. It is believed that this requires a rather awkward movement of the hand or hands of the operator that makes focal adjustment relatively difficult. In addition, the known helmet mounts fail to provide a simple means for adjusting the vertical position of the night vision device relative to the user's eyes. The performance of the night vision device is diminished if the user is unable to vertically align the device in a position in front of the eyes that enables a complete and steady view through the goggles.

Night vision devices and helmet mounts are often manufactured by different manufacturers. So that the parts will fit together, they are manufactured to certain specifications but having dimension variations of up to $10/1000$". The fit of the goggles into the helmet mount chassis is difficult with such variances. The fit should not be too loose, as noise emitting from jiggling contact between the goggles and the chassis (for instance, when the user is in motion) should be avoided. Moreover, jiggling of the goggles in the mount makes it more difficult to see clearly through the goggles. Yet, the fit of the goggles should not be so tight that it is difficult for the goggles to be connected with the helmet mount, or disconnected therefrom. A snug fit of the goggles into the helmet mount is desired with a minimum amount of force required to insert the goggles into the helmet mount. Moreover, it would be desirable to prevent the night vision device from being damaged if a certain force, such as an impact by a tree branch, is applied to the night vision device. A means for allowing the connection between the helmet mount and the night vision device to be disconnected when a certain force is encountered would prevent such unnecessary damage.

An additional problem encountered with current helmet mounts is the night vision device unintentionally moving from the stowed or in use position. For example, if the user has the night vision device in the stowed position it could be dangerous for the device to be inadvertently bumped or jolted into the use position. Accordingly, it would be desirable to have a locking mechanism that retains the night vision device in either the stowed or in use position until certain deliberate actions are taken by the user.

These and other problems exist with the flip-up helmet mounts for night vision devices disclosed in the prior art. Consequently, a need exists for an improved flip-up helmet mount.

SUMMARY OF THE INVENTION

The present invention, therefore, provides an improved flip-up helmet mount for night vision devices. More particularly, the flip-up helmet mount according to the present invention is designed to allow for a substantially quiet automatic shut-off night vision device that operates only when intended, and to allow for a snug fit of night vision devices into the helmet mount. In addition, the flip-up helmet mount is designed to allow for one-handed adjustment of the position, tilt, and focus of the night vision device.

The flip-up helmet mount includes a helmet block for securing the night vision device to a helmet, and a chassis for receiving the night vision device. The chassis is rotationally coupled to the helmet block by a bracket member extending between the helmet block and the chassis.

In a presently preferred embodiment, a goggle horn of the night vision device is secured into an adjustable socket assembly having an upper socket and a lower socket coupled to the upper socket. The lower and upper sockets have a goggle horn receiving area that substantially corresponds to the wedge-shaped goggle horn. However, the goggle horn receiving area is dimensioned to be slightly smaller than the smallest possible horn given the allowed tolerances.

Preferably, lower socket is capable of moving $20/1000"$ in a direction away from the upper socket while still being coupled thereto. Screws that provide the connection between the upper and lower sockets are placed through smooth holes in the lower socket, the holes with a counterbore spaced from the head of the screws, and connected to threaded holes in the upper socket. A spring is provided around each screw in the lower socket that biases the lower socket toward the upper socket. However, the counterbore allows the lower socket to be moved away from the upper socket against the spring force. Because the screws have a threaded connection to the upper socket, the upper socket and the screws maintain their positions relative to one another. As a result, the upper socket and the lower socket may separate while accommodating a goggle horn into the goggle horn receiving area.

The goggle horn slides over a detent in the goggle horn receiving area until the detent is received into an aperture in the goggle horn. When the detent is received into the goggle horn, the spring is biased to the original position thereby pulling the lower socket closer to the upper socket. Because of the dimensions of the goggle horn receiving area, a horn will always be under spring pressure while in the receiving area with the upper and lower sockets spread at least some distance apart. In an alternative preferred embodiment, the lower socket has a break away latch assembly instead of the fixed detent, which allows the goggle horn to be removed from the socket assembly when a certain force is applied to the night vision device. The break away latch assembly makes use of at least one spring that pushes against a latch that is pivotally secured in the lower socket.

A position adjustment assembly is provided within the helmet block for adjusting the night vision device between a use position, in front of the user's eyes, and a stowed position, out of the line-of-sight of the user. The flip-up helmet device includes an automatic shutdown assembly for automatically shutting down the night vision device when it is not in the use position. Further, in a presently preferred embodiment, the automatic shutdown assembly includes a magnet module having a vertically extending cavity with a substantially oval-shaped profile. A cylindrical bar magnet is slidably received within the cavity to move in response to movement of the night vision device between the use and stowed position. The automatic shutdown assembly automatically shuts down the night vision device whenever it is not in the use position. The shape of the cavity and the dimensions of the bar magnet combine to produce a reliable automatic shutdown assembly that is essentially jam proof. Placed in the cavity with the magnet is a damping fluid that has sufficient viscosity to slow the velocity of the magnet when the positions are being changed, so that noise emitted from contact of the magnet with the cavity sides is substantially eliminated. The fluid also reduces the possibility of inadvertent operation.

In a presently preferred embodiment, the position adjustment assembly includes a spring-biased ball and detent system, wherein a plurality of balls are biased by springs toward a shaft, rotationally received in a transverse bore in the helmet block, that includes a pair of transverse detents extending along the length of the shaft, corresponding to the use and stowed position of the night vision device. The spring-biased ball and detent system provides for extremely quiet operation of the flip-up helmet mount.

A tilt adjustment assembly is additionally provided for adjusting the tilt angle of the chassis relative to the bracket member, and thus the night vision device relative to the user's eyes. The tilt adjustment assembly includes a cam system, wherein rotation of a cam knob produces rotation of the chassis relative to the bracket member. The cam based tilt adjustment assembly provides for one-handed adjustment of the tilt angle of the night vision device. Moreover, the cam based assembly permits substantially infinite adjustment of the tilt angle within a predetermined range.

Additionally, in a presently preferred embodiment, a focal adjustment assembly is provided for adjusting the location of the night vision device relative to the chassis. The focal adjustment assembly includes a hinged release lever that is biased by a return spring to engage one of a plurality of notches on one of a pair of racks of the chassis. The night vision device is slidably received on the racks of the chassis. Application of a downward force on the release lever disengages the release lever from the notch and permits adjustment of the location of the night vision device relative to the chassis. The single release-lever provides for one-handed adjustment of the location of the night vision device and is believed to be ergonomically superior to prior art systems.

Vertical adjustment of the night vision device relative to the user's eyes is also provided for in a presently preferred embodiment. A rack/pin system achieves vertical movement of the chassis by moving a front plate that is slidably coupled to a back plate, wherein the chassis is adjustably coupled to the front plate. Additionally, a pin system is provided that uses a spring actuated button and gripping means to move up and down within a plurality of grooves that are machined into the back plate. Alternatively, vertical movement of the night vision device can be achieved by a gear drive system. The gear drive system moves the chassis up and down by rotational movement of a lever mounted to the front plate which is fixedly connected by a shaft to a gear disposed within a housing in the back plate, wherein rotation of the lever rotates the gear, thus causing the gear to move within the gear housing.

Additionally, a locking mechanism is provided in an alternative preferred embodiment which allows the night vision device to be moved from the stowed position to the use position, or vice versa, by compressing an activation button protruding from the helmet block. When the activation button is compressed, a shaft that is integrally connected to the activation button and disposed within the helmet block is pressed against a spring. The spring is mounted between the shaft and the helmet block, and when compressed a lock that is pressing against the shaft changes position, thereby disengaging the locking mechanism. A pivot sleeve is also disposed in the helmet block that is engaged by a side of the lock that is opposite the side pressing against the shaft, and when the activation button is compressed the pivot sleeve is able to rotate, thus allowing the position of the night vision device to be changed by the user.

BRIEF DESCRIPTION OF THE DRAWINGS

These and other features and advantages of the present invention will be appreciated as the same become better understood by reference to the following Detailed Description when considered in connection with the accompanying drawings, wherein:

FIG. 5 is a side elevation view of one of the racks of the chassis of the flip-up helmet mount of FIG. 2;

FIG. 6 is a perspective view of the helmet block;

FIG. 7 is a partial cross-sectional view of the automatic shutdown assembly, with the night vision device in the use position;

FIG. 8 is a partial cross-sectional view of the automatic shutdown assembly, with the night vision device in the stowed position;

FIG. 9b is a front view of the adjustable socket assembly of FIG. 9a;

FIGS. 10a, 10b, and 10c are back, top, and front views respectively of the lower socket of the adjustable socket assembly of FIG. 9a;

FIGS. 12a and 12b are front and bottom views respectively of the upper socket of the adjustable socket assembly of FIG. 9a;

FIG. 13 is a cross-sectional view of an embodiment of a magnet module assembly;

FIG. 14 is a partial cross-sectional view of the magnet module assembly of FIG. 13 when the night vision device is in the use position;

FIG. 15 is a partial cross-sectional view of the magnet module assembly of FIG. 13 when the night vision device is in the stowed position.

FIG. 20 is an exploded cross-section of the pin system of the rack/pin system shown in FIG. 17a;

FIG. 21 is a bottom elevation view of the bottom plate of the rack/pin system of FIG. 17a;

FIG. 23a is a bottom elevation view of the lever of the gear drive system shown in FIG. 22a;

FIG. 26a is a cross-sectional side view of the lock showing the angled face that contacts the pivot sleeve;

FIG. 26b is a cross-sectional front view of the lock showing the protruding bearing surface that contacts the shaft;

FIG. 26c is a cross-sectional view of the pivot sleeve showing the detents;

DETAILED DESCRIPTION

Figure 1:
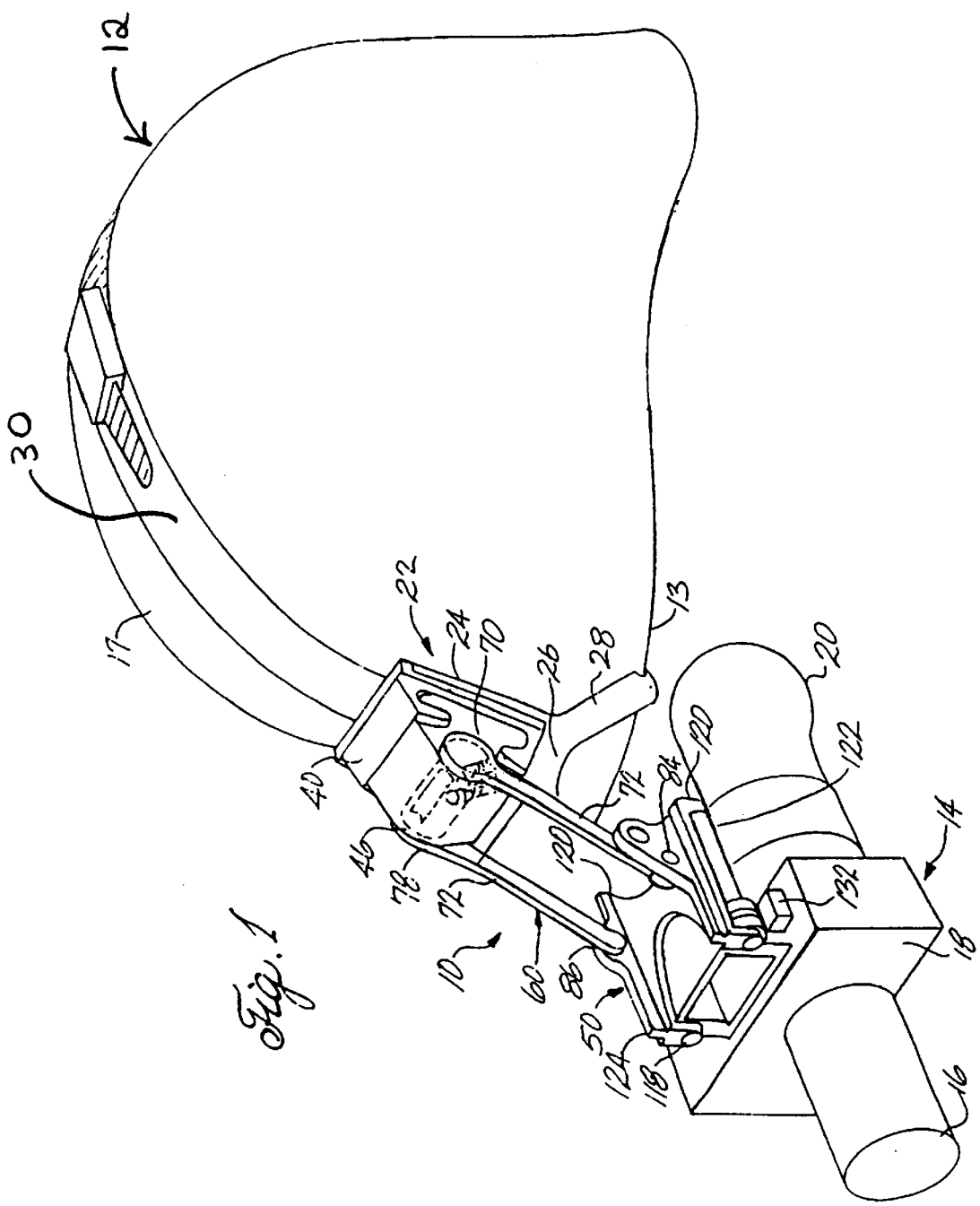
FIG. 1 is a perspective view of the flip-up helmet mount provided for in the present invention secured to a helmet, wherein the night vision device is in a use position.

Referring now to FIG. 1, a presently preferred embodiment of a flip-up helmet mount 10 according to the present invention is shown. The flip-up helmet mount 10 is shown in use with a standard U.S. Army Kevlar composite helmet 12. A night vision device 14 is secured to the helmet 12 by use of the flip-up helmet mount 10. The night vision device 14 shown in FIG. 1 is a device that includes a single objective lens 16, a housing 18, and a pair of eye pieces 20. To use the night vision device, the operator places it in the position depicted in FIG. 1 and looks into the eye pieces 20 to see an enhanced image representative of the low-level light from a night scene which has entered the objective lens. Many of the embodiments disclosed herein are similar to those found in U.S. application Ser. No. 09/538,828, filed on Mar. 30, 2000, the subject matter of which is hereby incorporated by reference.

The flip-up helmet mount 10 may be secured to the helmet in any of the ways well known in the art. FIG. 1 shows the flip-up helmet mount secured to the helmet by means of a quick release mechanism assembly 22. The quick release mechanism assembly includes a brace plate 24 having a broad based hook member 26. The hook member 26 include's a pair of laterally spaced apart hook portions 28, which engage under a brim 13 of the helmet. The quick release mechanism may be secured to the helmet by a strap 30 that includes ratchet means for adjusting the strap relative to the helmet to ensure a snug fit on various sizes of helmets. Alternatively, fasteners may be used to secure the quick release mechanism assembly directly to the helmet.

The flip-up helmet mount 10 includes a helmet block 40, which is releasably secured to the quick release mechanism assembly. A rear surface 42 of the helmet block (see FIG. 6) engages the brace plate 24 of the quick release mechanism assembly when the flip-up helmet mount is secured to the helmet. As can be seen in FIG. 1, a front surface 44 of the helmet block 40 (see FIG. 2) defines a transverse boss 46 having a transverse bore 48 therein. As will be described in more detail below, the night vision device is rotationally coupled with the helmet block to allow the user to pivot the night vision device between a use and a stowed position.

The flip-up helmet mount 10 also includes a chassis 50 slidably coupled with a socket assembly 52. The night vision device 14 is coupled with socket assembly 52. The socket assembly is slidably adjustable relative to the chassis to allow focal adjustment of the night vision device. The chassis is also coupled with the helmet block by an upright, or bracket member 60. The chassis is rotationally coupled with the bracket member at a proximal end of the bracket member to allow for tilt angle adjustment of the night vision device as described in more detail below.

Figure 9A:
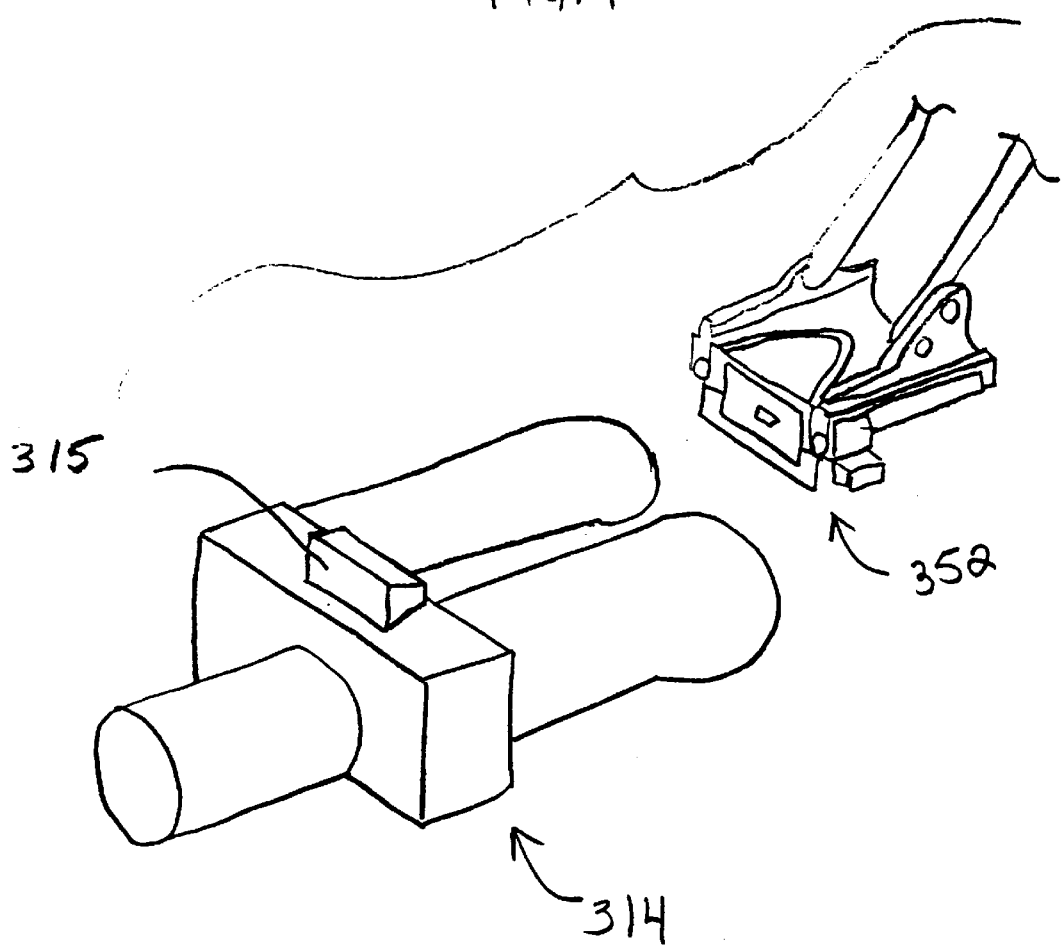
FIG. 9a is an expanded perspective view of the night vision device with a goggle horn that is receivable into an adjustable socket assembly.
Figure 9B:
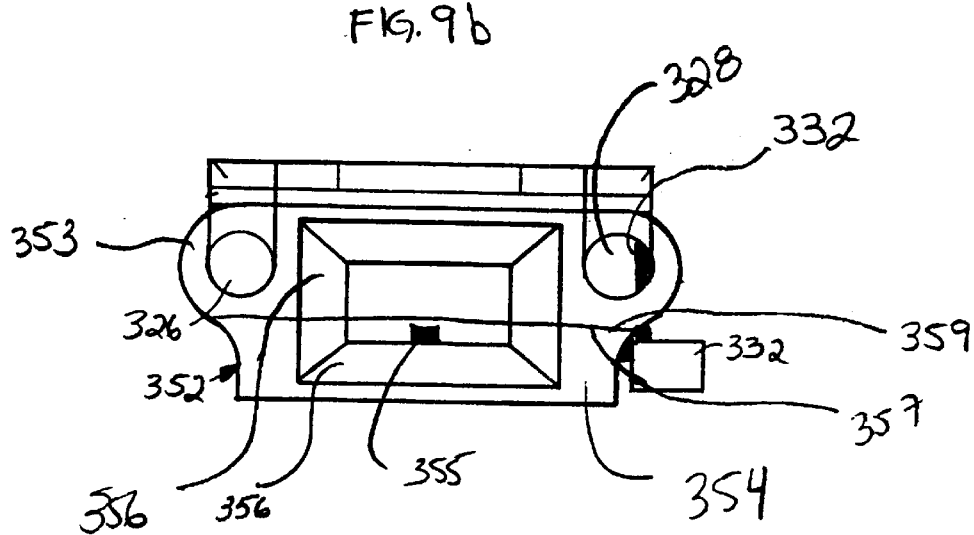
Figure 11:
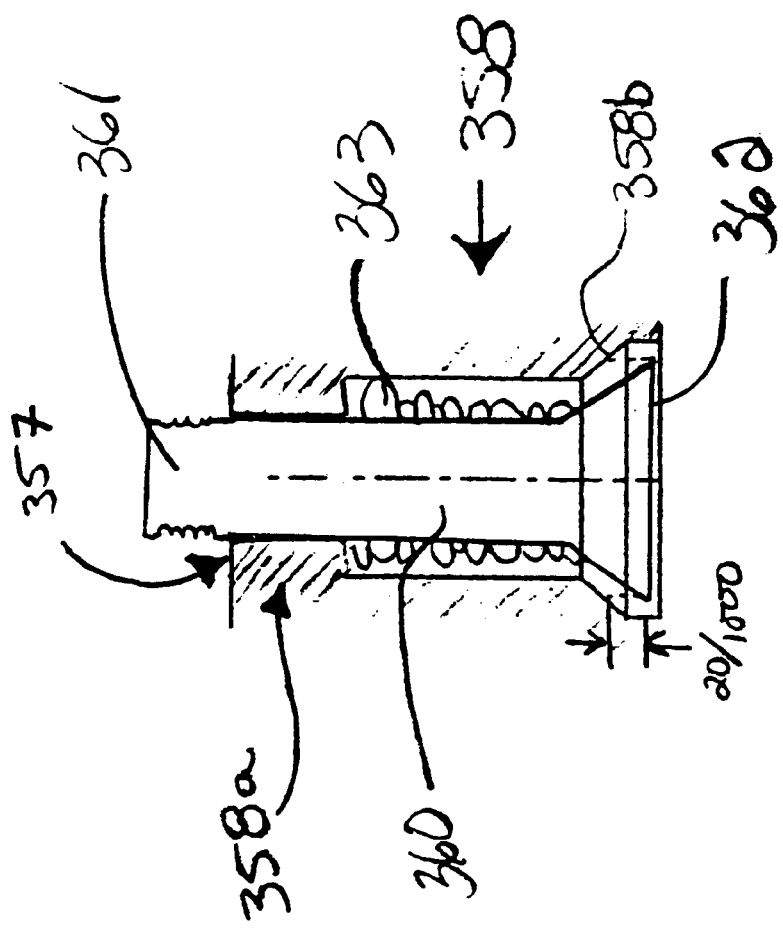
FIG. 11 is a cross-sectional view of a screw placed through one of the holes in the lower socket as shown in FIG. 10b.

In another embodiment shown in FIGS. 9a, 9b, a night vision device 314 is removably secured into an adjustable socket assembly 352. The adjustable socket assembly has an upper socket 353 and a lower socket 354 coupled to the upper socket by screws 360 (FIG. 11). The upper socket has a contacting surface 359. The lower socket has a contacting surface 357 that abuts contacting surface 359 when the upper socket and lower socket are coupled.

Figure 10A:
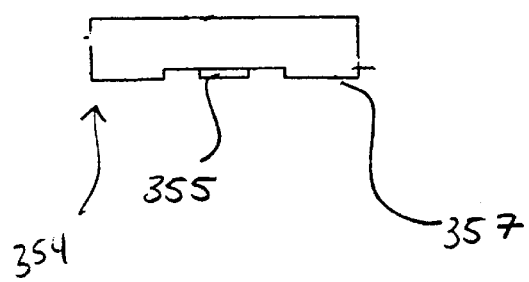
Figure 10B:
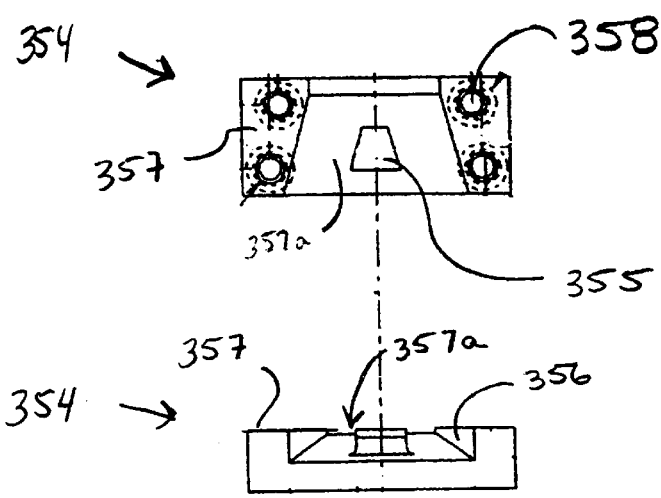
Figure 10C:
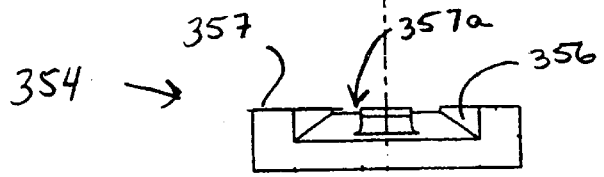

As shown in FIGS. 10a, 10b and 10c, the lower socket has one side of a goggle horn receiving area 357a formed by a tapered recess located centrally across the width of the socket in between contacting surfaces 357. In addition, the lower socket has cylindrical holes 358 that extend from the bottom of the lower socket through contacting surface 357 as shown in FIG. 11. Holes 358 are provided for receipt of screws 360. In a preferred embodiment, there are four holes, with two holes on each side of the goggle horn receiving area.

At an entrance area in the hole is an inwardly sloping entrance or counterbore 358b that is substantially conical-shaped. At the other end of the hole is an area of reduced cross-section 358a having smooth walls. In between the two ends of the hole is a main cylindrical section of the hole having smooth walls. The diameter of the hole near contacting surface 357 is smaller than the diameter throughout the main section. The smaller diameter section of the hole corresponds closely to the outer diameter of screw 360 placed therethrough for reasons described below. However, the screw is able to slide freely relative to the hole.

Each screw 360 has a main cylindrical body. At one end of the main cylindrical body is a threaded tip 361. At an opposite end of the main cylindrical body is a conical-shaped enlarged head 362 that corresponds to inwardly sloping entrance 358b. When the screw is placed through hole 358 and fastened into the upper socket as described below, the top head is spaced from the inwardly sloping entrance about $20/1000''$.

Wrapped around the cylindrical main body of the screw is a spring 363. In hole 358, the spring is limited on one end by conical shaped enlarged head 362, and on the other end by the area of reduced cross-section in the hole. The spring biases the screw outwardly in the hole, such that the screw head will normally remain spaced from the hole and hold the upper socket against the lower socket such that the contacting surfaces abut.

In a preferred embodiment the spring is made from 316 stainless steel. The passivation process to neutralize the material of the spring so as to avoid corrosion is controlled by government specification no. QQ-P-35C. The set length of the spring is 0.250 inch. The diameter of the wire is 0.024 inch. The diameter of the spring is 0.170 inch. The pitch of the spring is 0.050 inch. The ends of the spring are closed and ground, and the spring is set solid. In a particularly preferred embodiment, the spring is manufactured by C&F Wire, Buena Park, Calif., part no. 1555055.

As shown in FIGS. 12a and 12b, a recess extending centrally across the width of the upper socket 353 in between contacting surfaces 359 forms the other side of a goggle horn receiving area 359a. In addition, through contacting surfaces 359 of the upper socket are threaded holes 364 for receipt of and threaded connection to threaded tips 361 of the screws. There are four holes, with two holes on each side of the goggle horn receiving area. Each of these threaded holes 364 correspond to one of the holes of the lower socket.

Along inside surfaces of the recesses extending across the upper and lower sockets are sloping inner walls 356 that taper from a larger aperture on a front side of the socket assembly to a smaller aperture on a back side of the socket assembly. As shown in FIGS. 10a to 10c, on a bottom inner wall of the lower socket is a detent 355 used to securely connect the helmet mount with the night vision device. Detent 355 has a front surface that slopes back toward the back side of the socket assembly. The detent further has a back surface that hooks into the night vision device for secure assembly. The night vision device is removable from the socket assembly through uses of a lever provided in the night vision device.

As shown in FIG. 9a, the night vision device has a goggle horn 315 that is slidable into the adjustable socket assembly in between the upper and lower sockets. The goggle horn is manufactured to a certain specification within certain allowable tolerance levels. Generally, the tolerance levels are $10/1000''$. The goggle horn is wedge-shaped such that it has a larger front area that tapers down to a smaller back area. The sloping inner walls of the recesses in the upper and lower sockets that taper from the front side of the socket assembly to the back side generally correspond to the wedge-shape of the goggle horn.

The goggle horn has an aperture on a bottom side (not shown) for receipt of the detent.

The goggle horn slides over detent 355 until the detent is received into the aperture of the goggle horn. With contacting surfaces 357, 359 of the lower and upper sockets adjoining, the screws each with the surrounding spring are slid through holes 358 in the lower socket and then fastened into corresponding threaded holes 364 of the upper socket. The threaded end of the screw fastens into the threaded hole of the upper socket a limited distance such that there is a small distance (e.g. $^{20}/_{1000}$") between the top head of the screw and the tapered entrance of the smooth hole.

When fastened together with the spring connection, the lower and upper sockets are capable of separating up to $^{20}/_{1000}$" apart as the goggle horn slides into the socket assembly. In the case where the specification and the tolerances are at or near a maximum dimension for the goggle horn, the goggle horn that is placed into the front aperture of the socket assembly forces the upper and lower sockets apart until the detent is received into the goggle horn. Threaded bottom 361 of the screw remains in the upper socket so that the screw remains fixed relative to the upper socket and is pulled upward in the hole as the upper and lower sockets are moved apart until the top head of the screw abuts inwardly sloping entrance 358*b*. The distance between the top head of the screw and inwardly sloping entrance 358*b* is about $^{20}/_{1000}$", which allows the lower and upper sockets to separate that distance.

When the detent is received into the goggle horn, the spring biases the sockets to their original positions thereby pulling the lower socket closer to the upper socket, and pushing top head 362 away from inwardly sloping entrance 358*b*.

Automatic Shut Down Assembly

Figure 3:
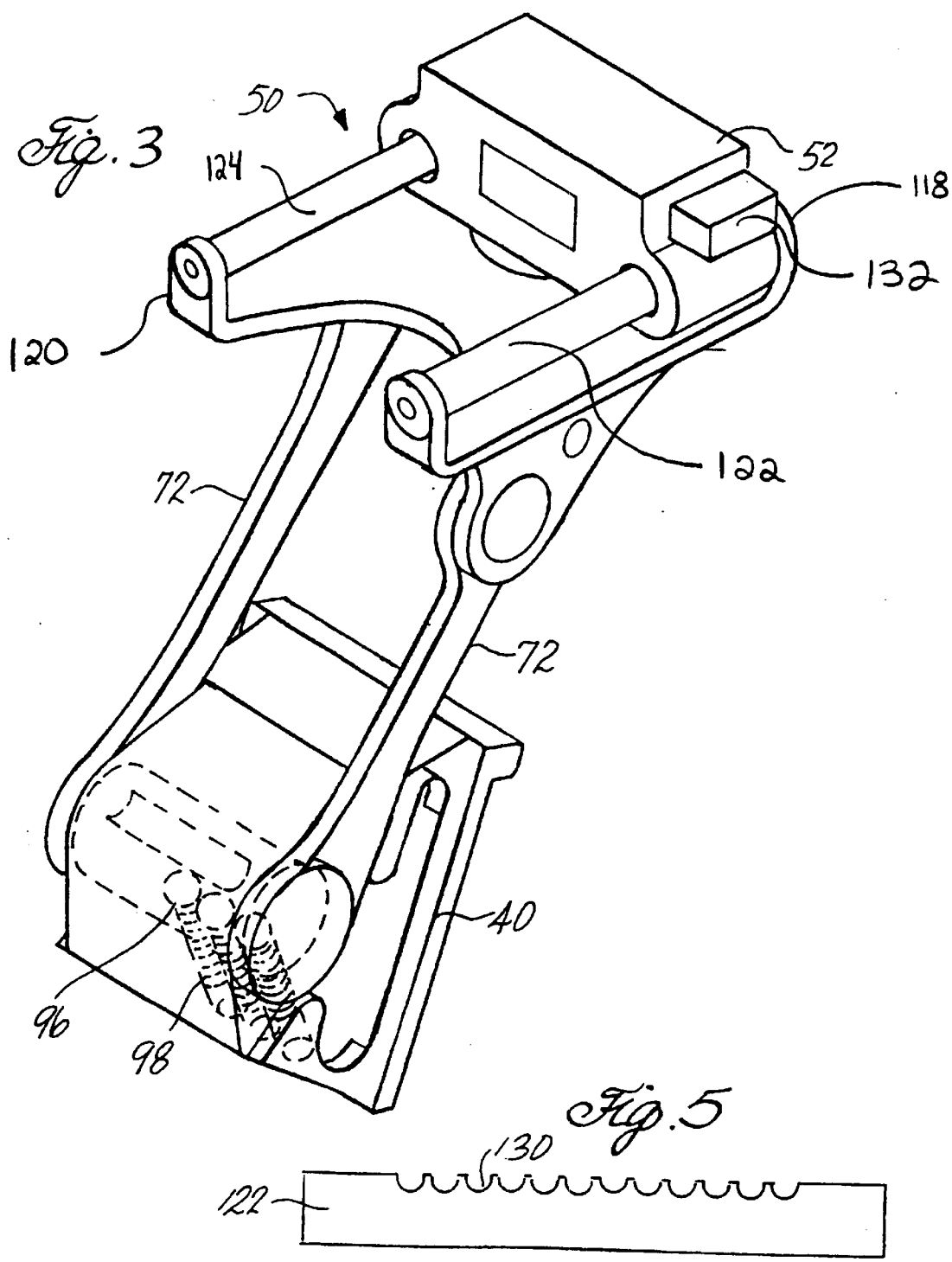
FIG. 3 is a perspective view of the flip-up helmet mount of FIG. 1 in a stowed position.

The flip-up helmet mount 10 enables an operator to adjust night vision device 14 between a use or operation position, shown in FIG. 1, and a non-use or stowed position, shown in FIG. 3. The flip-up helmet mount automatically shuts down the night vision device when in the stowed position. More particularly, the flip-up helmet mount provides for reliable, substantially quiet and essentially jam proof, automatic shutdown of the night vision device.

The night vision device includes a power supply in the form of a battery pack (not shown) internal to housing 18. A power supply circuit provides power to an image intensifier tube (not shown), which supplies to eye pieces 20 an intensified image in phosphor yellow/green light of the scene viewed by objective lens 16. The power supply circuit also includes a magnetically-responsive switch, schematically indicated as 138 in FIG. 2. The switch 138 maintains electrical power supply to the night vision device once it is turned on by the user only so long as a magnetic field of sufficient strength is supplied to switch 138. An automatic shutdown assembly is practically essential when using a flip-up helmet mount, because if the user forgets to turn off the night vision device before moving it to the stowed position, the phosphor yellow/green light emitted from eye pieces 20 would be visible to possibly hostile personnel in front of the user. The phosphor yellow/green light would appear as a pair of small spot lights and may be visible at great distances at night, indicating the position of the user of the night vision device to those in front of the user.

Accordingly, the flip-up helmet mount includes an automatic shutdown assembly 140 to provide the necessary magnetic flux to switch 138 when the night vision device is in the use position, while at the same time insuring that the magnetic field is removed from the switch when the night vision device is pivoted to the stowed position. The automatic shutdown assembly includes a magnet module 142 in socket assembly 52. Magnet module 142 is located at a rear section 144 of the socket assembly, immediately above magnetically responsive switch 138 of the night vision device. Module 142 has a vertically extending cavity 146, having a substantially oval-shaped profile, as can be seen in FIGS. 6 and 7. Cavity 146 includes two ends, a use end 148 adjacent to switch 138, and a stowed end 150 opposite switch 138.

Slidably received within the cavity 146 is a cylindrical bar magnet member 162. Bar magnet 162 provides sufficient magnetic flux to switch 138 to keep the night vision device turned on so long as magnet 162 is in, or immediately adjacent to, use end 148 of cavity 146. As can be seen from FIG. 6, magnet 162 is in this position when the night vision device is in the use position. By way of contrast, however, when the user flips-up the night vision device into the stowed position, gravity acts on the bar magnet to move the magnet away from use end 148 of the cavity toward stowed end 150 of cavity 146. The bar magnet is sufficiently far enough from the magnetically responsive switch when it is in the stowed end of the cavity that the night vision device is automatically turned off.

In a preferred embodiment shown in FIGS. 13–16, a magnet module assembly 342 under construction has a cavity 346 opened up to a top surface 321 of the magnet module assembly. The cavity is oval-shaped with each end 348, 350 of the cavity being rounded. Through the open top surface of the magnet module assembly 342 a magnet 362 is inserted into the cavity 346. The magnet is cylindrical and has a generally square shaped cross-section when cut lengthwise as shown in FIG. 13.

Figure 16A:
FIG. 16a is a top view of a cap of the magnet module assembly of FIG. 13.
Figure 16B:
FIG. 16b is a side view of a plug of the magnet module assembly of FIG. 13.
Figure 16C:
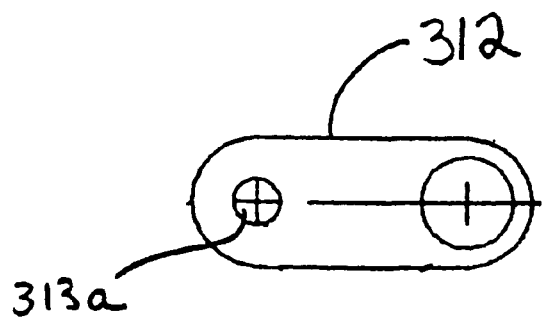
FIG. 16c is a top view of a screen of the magnet module assembly of FIG. 13.
Figure 16D:
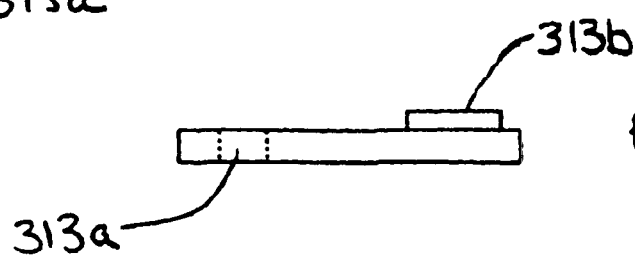
FIG. 16d is a side view of the screen of FIG. 16c.

A screen 312 is fit into the magnet module assembly over top of the magnet. The screen is oval-shaped to correspond with the shape of the cavity. As shown in FIGS. 16*c* and 16*d* the screen has a hole 313*a* through one end of the screen, and a circular protrusion 313*b* on another end. The damping fluid is inserted with a syringe into hole 313*a* of the screen. When the cavity is filled with the damping fluid, a plug 311 is inserted into hole 313*a*. When inserted in hole 313*a*, the plug corresponds in shape to the circular protrusion on the screen. A cap is then fit over the plug and circular protrusion flush with top surface 321 of the magnet module assembly and then sealed with an adhesive.

The damping fluid 320 is placed in cavity 346 around and over the magnet to dampen the movement of the magnet and to eliminate noise from the magnet contacting the magnet module assembly. Further, when the user of the night vision device is in motion, the damping fluid substantially maintains the magnet in the use or stowed position. Thus, in order to turn the night vision device light on and off, there is required a deliberate rotational motion between positions shown in FIGS. 14 and 15.

FIGS. 14 and 15 disclose cut away top views of the magnet module assembly 342 with the magnet placed in cavity 346 to assist in showing its relative position in the cavity. Similar to the embodiment shown in FIGS. 7 and 8, the magnet is movable from a first position in one cavity end 348 that operates the night vision device to a second position in an opposite cavity end 350 that shuts off the night vision device operation.

In a preferred embodiment, damping fluid 320 is a viscous liquid which is free from suspended matter and sediment.

The fluid has a viscosity in the range of 5 cs to 15 cs, and a specific gravity at 77° F. in the range of 0.85 to 0.95. The viscosity of the damping liquid is preferably stable over the temperature range of −60° F. to 158° F. The damping fluid is preferably inert and has low air entrapment. These features are preferred so that the damping effect of the fluid remains relatively the same over time with use and during use in different surrounding environments.

Preferably, the fluid is a dimethyl silicone fluid. More preferably, the damping fluid is a polymethylsiloxane polymer manufactured to yield essentially linear polymers with an average kinematic viscosity of about 10 cs. A preferred damping fluid may be obtained from Dow Corning, Midland, Mich., product no. 200 Fluid, 10 cs.

One of the important advantages of automatic shutdown assembly 140 provided for in the flip-up helmet mount is that it is more reliable than the assemblies provided for in the prior art. The reliability of the shutdown assembly is due in part to the substantially straight cavity and the dimensions of the bar magnet, specifically the length-to-diameter ratio of the magnet. In a presently preferred embodiment, the magnet is a ¼ inch long, ¼ inch diameter cylindrical bar. Preferably, the length to diameter ratio of the bar magnet is about 1:1.

In use of the flip-up helmet mount, the operator first secures the quick release mechanism assembly to the helmet and then secures the flip-up mount to the quick release mechanism assembly. Once the flip-up mount is secured to the helmet, the night vision device may be secured to the socket assembly and adjusted into its use position seen in FIG. 1. As so positioned, the bar magnet member is positioned such that the night vision device remains on once the operator switches it on. In this position, the operator is able to adjust the tilt and focus of the goggle using a single hand, allowing the operator to optimize the viewing conditions of the goggle without occupying both of his hands during the adjustment process. When the operator flips the goggle up to its stowed position, the goggle is automatically turned off, as explained above.

POSITION ADJUSTMENT

In FIG. 1, the night vision device is positioned in front of the operator's eyes so that the operator may look through the eye pieces 20 of the night vision device. However, the flip-up helmet mount also allows the operator to flip the night vision device into a stowed position, completely above the line of sight of the operator, to permit normal, unobstructed vision.

In order to enable the operator to adjust the position of the night vision device, the night vision device is rotationally coupled with helmet block 40. A cylindrical shaft 70 is rotationally received within transverse bore 48 of the helmet block. Coupled with and carried by shaft 70 is bracket member 60. The bracket member includes a pair of spaced apart flange portions 72, which are coupled together by a transverse web portion 74. Proximal ends of flange portions 76, 78 of the bracket member are coupled with respective ends of cylindrical shaft 80, 82. Additionally, distal ends of flange portions 84, 86 of the bracket member are coupled with a respective side of the chassis 88, 90. Chassis 50 is coupled with bracket member 60 to allow some rotation of the chassis relative to the bracket member. The coupling of shaft 70 to bracket member 60, the bracket member to the chassis, and the night vision device to the chassis results in the night vision device being rotationally coupled with helmet block 40.

Additionally, in order to provide retention of the night vision device in either of its operation or stowed position, the flip-up helmet mount includes a spring-biased ball and detent system 92 within the helmet block as shown in FIG. 6. A plurality of bores 94 are provided within the helmet block for receiving a plurality of spring-biased ball plungers 96. A spring 98 extends through each of the plurality of bores 94. One end 97 of each spring is pinned or fixed, and the other end 99 of each spring bears against a smooth ball plunger 96. The bores are located within the helmet block so that the spring pressure biases the ball plungers against cylindrical shaft 70. Additionally, the bores are located within the helmet block so that the ball plungers are aligned parallel to axis of rotation 71 of the shaft.

A pair of transverse detents 102 extend along the length of shaft 70. The detents receive. the spring-biased ball plungers 96 to releasably retain the night vision device in either the use or stowed position. Detents 102 are angularly located on shaft 70 to correspond, respectively, to the use and stowed position of the night vision device. Generally speaking, the detents are located about 180 degrees apart on the shaft. More particularly, shaft 70 is located within transverse bore 48 of helmet block 40 such that when the night vision device is in the use position, ball plungers 96 are biased by spring pressure into the use detent (not shown). Conversely, when the night vision device is in the stowed position, ball plungers 96 are biased by spring pressure into stowed detent 102. As the user adjusts the night vision device from the use to the stowed position, the spring-biased ball plungers are released from the use detent, and eventually engage the stowed detent, once the goggle has been rotated out of the user's line of sight and into the stowed position.

Preferably, the spring pressure is such that the friction between the balls and the shaft is sufficient to retain the night vision device in a selected position even if the night vision device has not been fully rotated into the use or stowed position. In other words, the spring pressure should be sufficient to prevent a pivotal free fall of the night vision device should the user not detent the system in its stowed position.

It should be obvious to one skilled in the art that the force required to adjust the night vision device from the use to the stowed position will depend on a number of factors, including, the number of spring-biased plungers, the size of the spring-biased plungers, the strength of the springs, the depth of the detents, etc. In a presently preferred embodiment, these and other variables have been selected to satisfy the current specifications of the United States Army with respect to helmet mount assemblies, and in particular, the requirements of QAP No. A3260927. In order to satisfy these requirements, in a presently preferred embodiment, three spring-biased ³⁄₁₆th inch smooth ball plungers are adapted to engage an use detent having a depth of about 0.05 inches, and a stowed detent, having a depth of about 0.075 inches. Obviously, however, the specifics of any of these variables may vary with the requirements of the application for which the flip-up mount is being used.

One of the important advantages of the spring-biased ball and detent assembly is that it provides for extremely quiet operation of the flip-up helmet mount as the night vision device is adjusted between the use and stowed position. Additionally, the spring-biased ball and detent assembly allows for simple, one-handed adjustment of the night vision device between the use and stowed position.

Preferably, the helmet block and the spring-biased ball and detent system are designed to optimize the durability of the flip-up helmet mount. In particular, in a presently preferred embodiment, the helmet block is designed without any stops on the body of the helmet block corresponding to the stowed position. Prior art flip-up helmet mounts typically include at least one stop on a side of the helmet block to prevent the flip-up helmet mount from over rotating when stowed. The flip-up mount may over rotate if an excessive amount of force is applied to the mount, for example, when the flip-up mount is attached to the helmet and the helmet is dropped on the flip-up mount. In attempting to prevent over rotation of the flip-up mounts, the stops often exert an excessive force on a small section of the flip-up mount that may result in failure of the structure. Therefore, it is believed that removing the stops corresponding to the stowed position of the helmet will increase the durability of the flip-up mount. In particular, removing the stops will cause the night vision device to first contact the helmet if the flip-up mount over rotates. Additionally, the spring-biased ball and detent system will act as a buffer to absorb some of the energy and momentum of the night vision device as it begins to over rotate.

Tilt Adjustment

In addition to allowing for adjustment of the position of the night vision device, the flip-up helmet mount also allows for adjustment of the tilt of the night vision device relative to the user's eyes. In a presently preferred embodiment shown in FIG. 2, a cam system 104 is provided to permit tilt angle adjustment of chassis 50. The cam system 104 includes a cam knob 106 located adjacent the distal end one of the flanges of bracket member 60. Rotation of the cam knob 106 causes rotation of a cam 108 and of a shaft 110. Shaft 110 rotationally couples the chassis 50 to the bracket member. Therefore, rotation of cam knob 106 results in rotation of the chassis, and thus tilting of the night vision device relative to the user's eyes. In a presently preferred embodiment, the cam system includes a friction washer 51 on the back side of the cam, which produces enough friction such that the chassis will not slip under normal operating conditions.

One of the important advantages of the cam operated tilt adjustment assembly 104 is that it allows for simple, one-handed tilt angle adjustment of the night vision device. As can be appreciated from FIG. 2, tilt adjustment can be accomplished by using only one hand to turn the cam knob. The design of the cam operated tilt adjustment assembly allows for real-time adjustment of the tilt angle of the night vision device. Moreover, the cam operated tilt adjustment assembly allows for substantially infinite adjustment of the tilt angle within a predetermined range, rather than limiting the tilt angle adjustment to one of a plurality of predetermined levels.

Focal Adjustment

The flip-up helmet also allows for focal adjustment of the location of the night vision device relative to the user's eyes. As described above, the night vision device is coupled with the socket assembly 52 on the chassis. As shown in FIG. 3, the chassis includes a pair of side members 112, 114, connected by a central member. Each side member has a front depending segment 118 and a rear depending segment 120. A pair of racks 122, 124 extend between the front and rear depending segments. Socket assembly 52 has a pair of holes 126, 128 on opposite ends of the socket assembly. Through holes 126, 128, the socket assembly is slidably received on racks 122, 124. As a result, when the night vision device is in the use position, the location of socket assembly 52 may be adjusted relative to the chassis along the racks 122, 124, resulting in adjustment of the location of the night vision device 14 relative to the user's eyes.

In order to provide for retention of the night vision device 14 once focal adjustment is complete, as shown in FIG. 5, a plurality of notches 130 are provided on one of racks 122 for engagement of a release lever 132. Release lever 132 is biased under spring pressure to engage one of the notches in the rack 122, essentially locking the night vision device in a selected position relative to the user's eyes. In order to adjust the position of the night vision device relative to the user's eyes, it is simply necessary to apply a downward force to the release lever 132. The downward force causes the release lever to pivot around a pin, disengaging the lever from notch 130. Once the release lever has been disengaged from the notch, the position of the night vision device 14 may be adjusted by moving the socket assembly 52 forward or backward along racks 122, 124 of the chassis 50. When the night vision device has been positioned as desired, the user may release the lever, which will be biased into one of the notches by a return spring.

Figure 4:
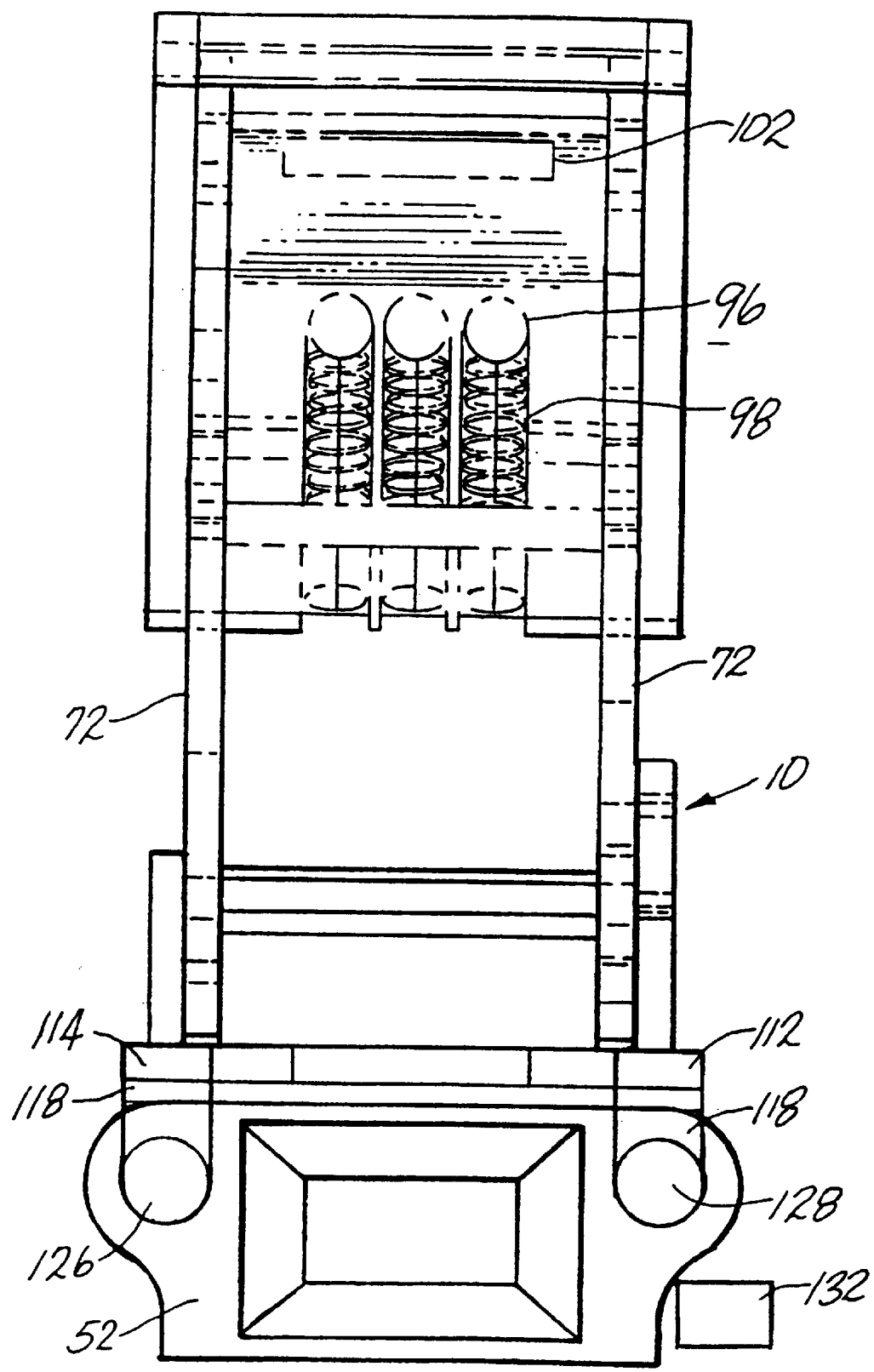
FIG. 4 is a front elevation view of the flip-up helmet mount of FIG. 2.

Again, one of the important advantages of the focal adjustment assembly provided for in the flip-up helmet mount is that it allows for simple, one-handed focal adjustment of the night vision device. As can be appreciated from FIG. 4, focal adjustment can be accomplished by using only one hand to push downward on release lever 132. Moreover, the use of a single release lever requiring the application of a downward force to permit focal adjustment is believed to be ergonomically superior to the designs disclosed in the prior art.

It should be noted that in a presently preferred embodiment, a number of the components of the flip-up helmet mount are made from aluminum. Prior art helmet mounts were generally made from plastic. The novel design of the flip-up helmet mount provided for in the present invention, permits the use of aluminum for a number of components, providing added strength and stability to the structure, while not increasing the overall weight of the flip-up helmet mount when compared to the plastic versions disclosed in the prior art. Specifically, in the presently preferred embodiment where only the helmet block and the magnet module remain plastic, the flip-up helmet mount is approximately 10% lighter than most of the prior art plastic flip-up mounts.

Vertical Adjustment with Rack/pin System

Figure 17A:
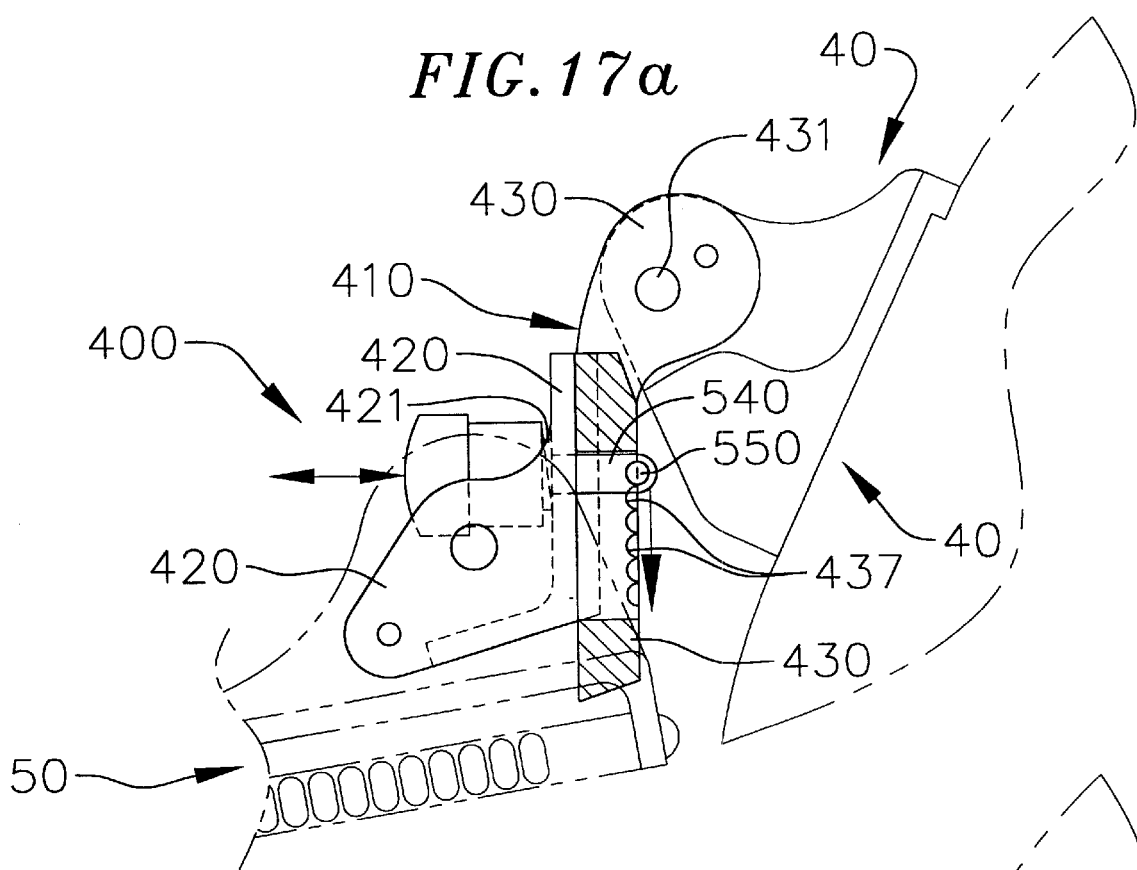
FIG. 17a is a partial cross-sectional side view of a rack/pin system in an up position.
Figure 17B:
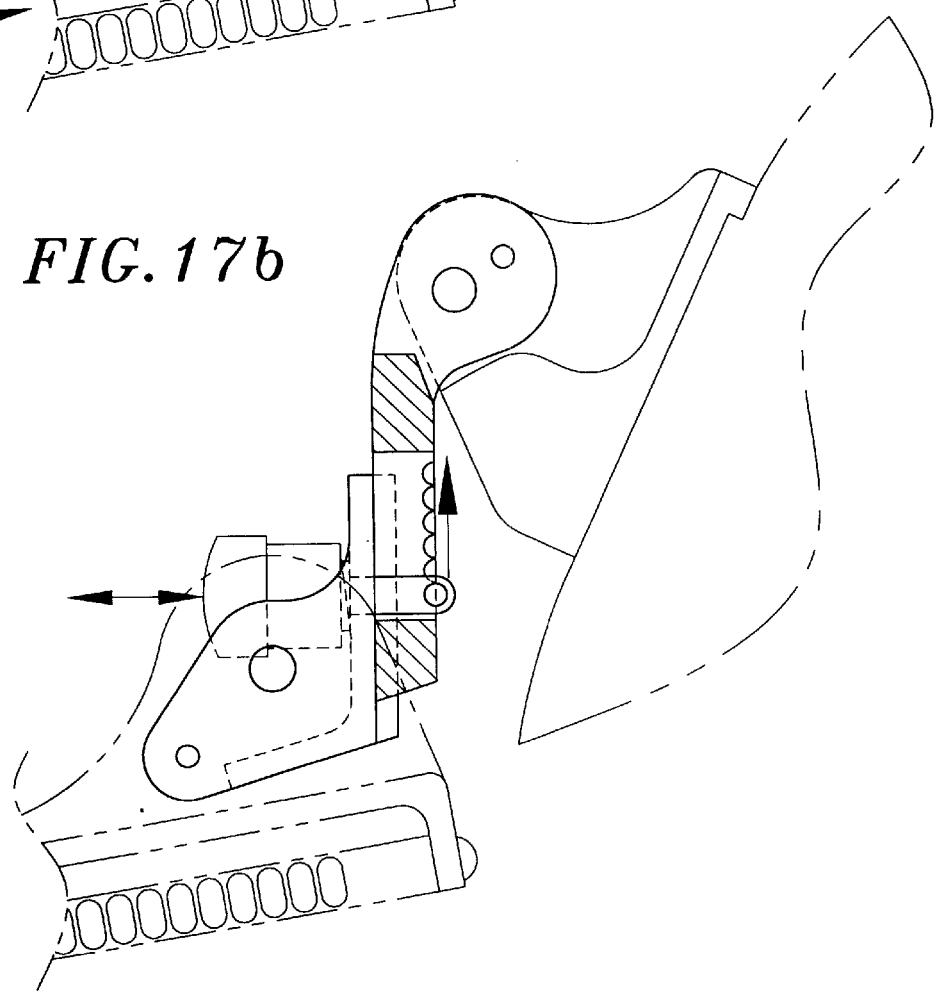
FIG. 17b is a partial cross-sectional side view of the rack/pin system in a down position.

The flip-up helmet mount may also allow for vertical adjustment of the night vision device relative to the user's eyes. In one preferred embodiment shown in FIGS. 17a and 17b, a rack/pin system 400 is provided to allow vertical adjustment of the chassis 50. In describing the vertical adjustment achieved by the rack/pin system 400, the helmet block 40 will be considered proximal to the rack/pin system 400, and the chassis 50 will be considered distal to the rack/pin system 400. Moreover, vertical movement in the proximal direction will be considered up, while movement in the distal direction will be considered down. Accordingly, FIG. 17a shows the rack/pin system in the up position, while FIG. 17b shows the rack/pin system in the down position.

The rack/pin system 400 comprises a rack 410 that attaches to the helmet block 40. The rack has a front plate 420 and a back plate 430. When the rack/pin system is incorporated into a fully assembled helmet mount 10, the front plate 420 and back plate 430 are slidably connected to each other, while the back plate 430 is rotatably coupled to the helmet block and the front plate 420 is adjustably coupled to the chassis.

Figure 18:
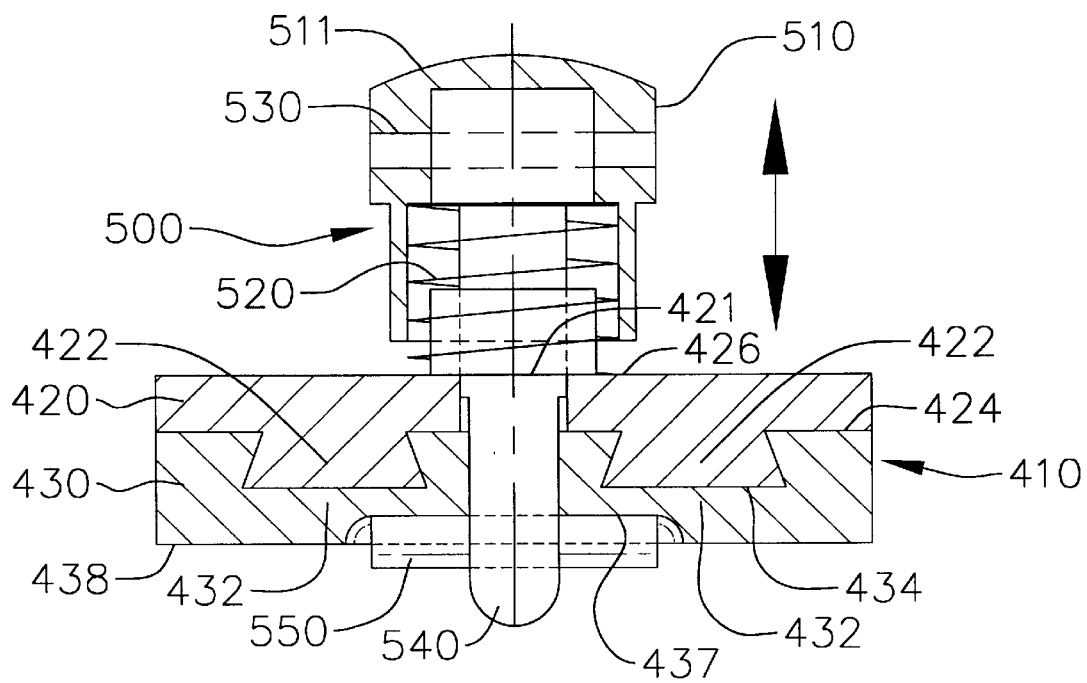
FIG. 18 is a top cut away cross-sectional view of the rack/pin system of FIG. 17a, where the release button is not compressed.

As shown in FIG. 18, the front plate 420 and back plate 430 of the rack 410 are connected in a dovetail type interface. In a preferred embodiment, the connection is a double dovetail type interface. Specifically, the front plate 420 and back plate 430 are slidably engaged by aligning a pair of parallel protruding ridges 422 extending vertically across an engaging surface 424 of the front plate 420 with a pair of recesses 432 that have been machined into an engaging surface 434 of the back plate 430. Dovetail alignment of the protruding ridges 422 of the front plate with the recesses 432 of the back plate engages the front and back plates in such a way that the plates of the rack 410 only move relative to one another by precisely sliding vertically up and down.

Figure 2:
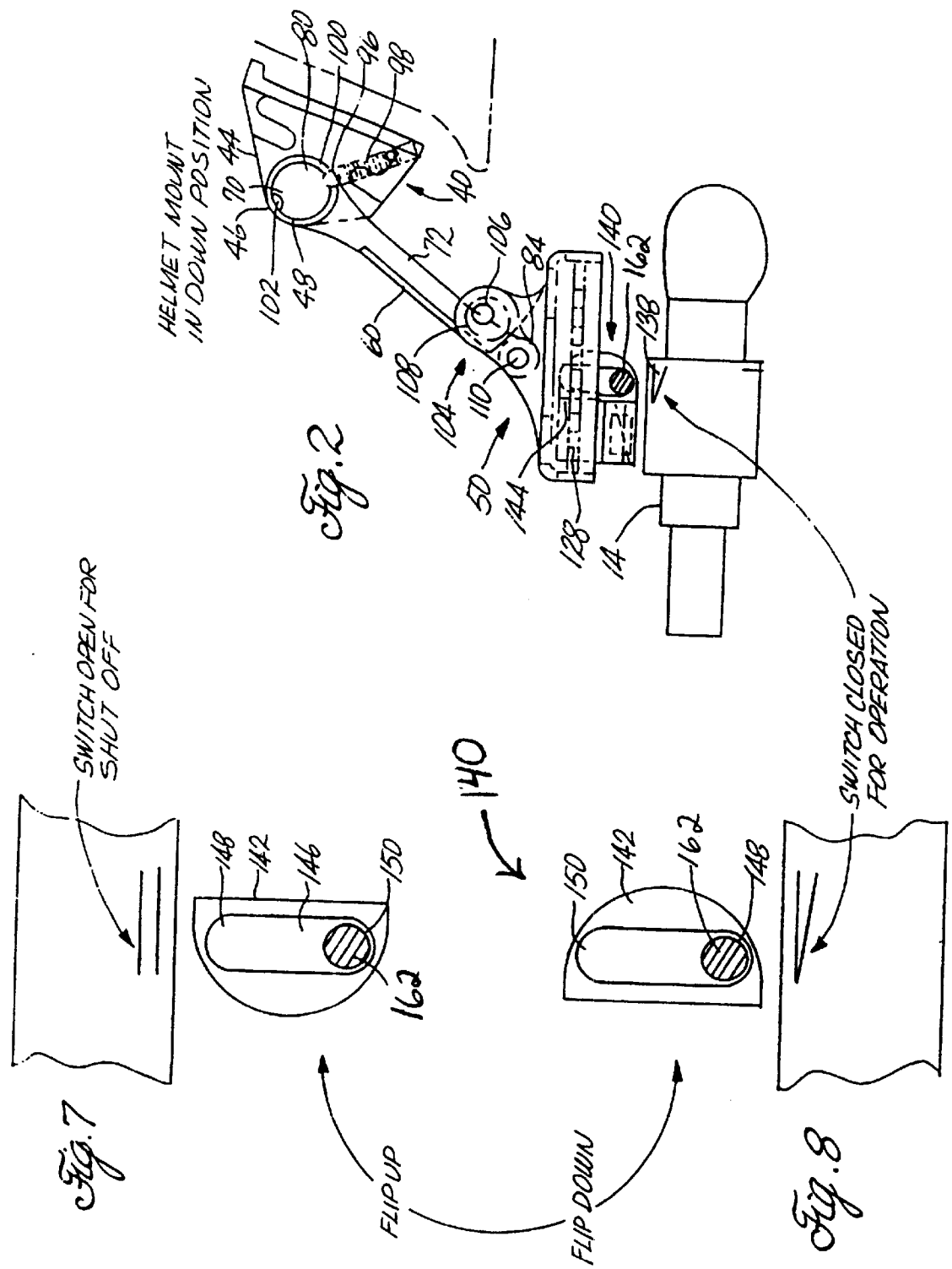
FIG. 2 is a side elevation view of the flip-up helmet of FIG. 1, removed from the helmet.

The back plate 430 couples to the helmet block in much the same way as the bracket member 60 of the earlier described embodiment shown in FIG. 2. Namely, the cylindrical shaft 70 passes through a pair of apertures 431 in a proximal end of the back plate 430 and is received within the transverse bore 48 of the helmet block 40, thereby coupling the back plate 430 to the helmet block. The back plate 430 is still rotatably coupled to the helmet block 40 so as to allow the night vision device to be moved from either the stowed or use position.

The front plate 420 is connected to the chassis 50 in such a way that continues to allow for tilt adjustment of the chassis 50, as discussed above. Namely, as shown in FIG. 2, the front plate is coupled to the chassis through a pair of apertures in a distal end of the front plate and through a single aperture in the front plate where the cam knob 106 of the cam system 104 is positioned.

Once the back plate 430 has been coupled to the helmet block and the front plate 420 has been coupled to the chassis, and the front plate and back plate are slidably engaged by dovetail alignment of their respective ridges and recesses, the rack 410 provides adjustable movement between the helmet block and the chassis. Normally, the helmet block is considered to be fixed or stationary, as when it is mounted to a helmet. Therefore, when the night vision device is in the use position, as opposed to the stowed position, the back plate 430 is normally considered stationary for purposes of the vertical adjustment of the night vision device with respect to the user's eyes. Consequently, the vertical adjustment of the night vision device is accomplished by vertical movement of the front plate 420, which is coupled to the chassis 50 and in turn the night vision device. Therefore, the front plate 420 moves up or down while it is slidably engaged with the stationary back plate 430.

Figure 19:
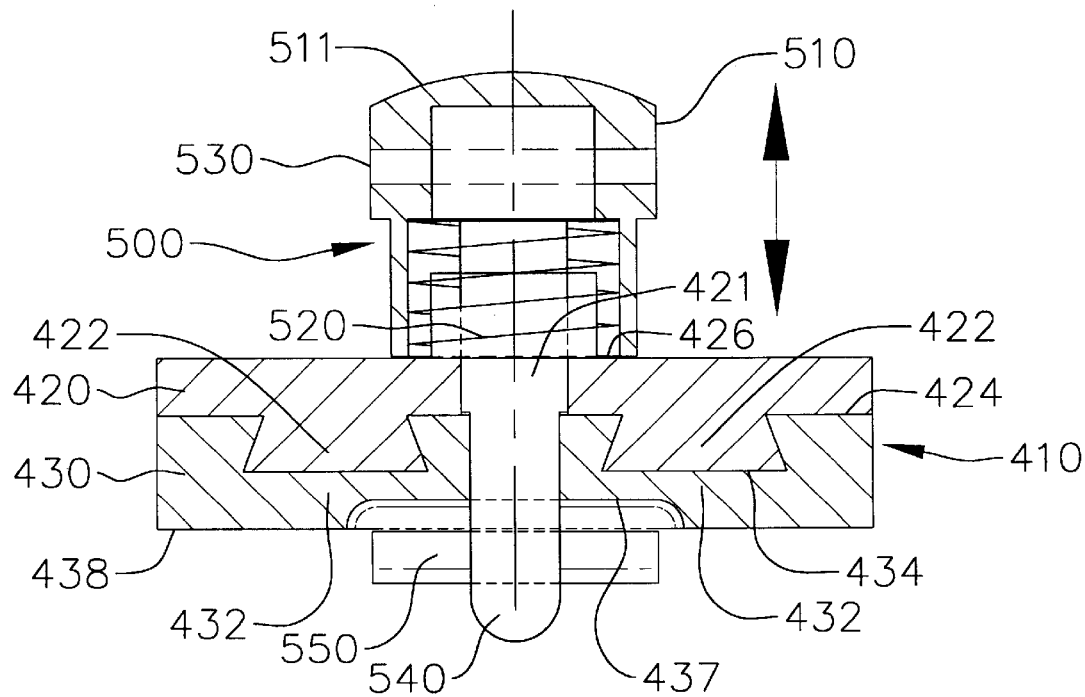
FIG. 19 is a top cut away cross-sectional view of the rack/pin system of FIG. 17a, where the release button is compressed.

The vertical movement of the front plate 420 in the embodiment of FIGS. 17–21 is regulated by a pin system 500. As shown in FIGS. 18–20, the pin system 500 comprises a release button 510, a coil actuator spring 520, a spring pin 530, an actuator 540, and a dowel pin 550. Generally, the assembled pin system 500 is disposed through an aperture 421 in the front plate 420 and an elongated aperture 436 (FIG. 21) in the back plate 430. The pin system remains fixed to the front plate and moves vertically up and down with the front plate along the elongated aperture 436 in the back plate 430, where the pin system can be locked into any one of a plurality of grooves 437 that are machined into a back surface 438 of the back plate 430.

Prior to using the pin system 500 to vertically adjust the night vision device, the pin system is assembled and installed into the helmet mount 10. The assembly of the pin system begins with the release button 510. The generally cylindrical release button 510 has a closed convex face 511 at a first enlarged end that is adapted for being pushed by the user's hand and an open interior 512 opening at a second end opposite face 511, for receiving the actuator 540 and coil actuator spring 520. As shown in FIGS. 18 and 19, the entire. release button 510 is positioned over a front surface 426 of the front plate 420.

Referring to FIG. 20, the actuator 540 is inserted into the open interior 512 of the release button 510. The actuator 540 has a generally cylindrical shape with a top portion 542, a body portion 544, and a bottom portion 546. The top portion 542 of the actuator is adapted to be inserted into a recess 513 at the top of the open interior of the release button 510. The top portion of the actuator has a through hole 543 that is designed to be aligned with a pair of apertures 514, located opposite one another along the side of the enlarged end of the release button 510, when the actuator is disposed within the release button. After the hole and the apertures in the top portion 542 of the actuator and the release button 510 have been aligned, a spring pin 530 is disposed through the hole and apertures to couple the actuator and release button. The spring pin 530 preferably is hollow with a slit along its length, and may also be referred to as a rolled pin. The spring pin preferably is a $\frac{1}{16}$ inch diameter pin that is compressed upon insertion into the hole and apertures and then expands outwardly to create friction with the hole and apertures, and thus fixedly couple the actuator 540 and release button 510.

The next step in assembling the pin system 500 is to dispose the actuator spring 520 around the actuator 540 until the actuator spring is positioned adjacent, or slightly within, the open interior 512 of the release button 510. The actuator spring 520 rests between the release button 510 and the front surface 426 of the front plate 420, and is preferably disposed around the body portion 544 of the actuator 540. The actuator 540 is disposed through the front plate 420 and back plate 430, and at least part of the bottom portion 546 of the actuator extends through the back surface 438 of the back plate 430.

The bottom portion 546 of the actuator 540 has a second through hole 548 that is aligned in the same horizontal direction as the through hole in the top portion 542 of the actuator. Further, the second through hole in the bottom portion 546 of the actuator is intended to extend beyond the back surface 438 of the back plate 430 when the pin system 500 is assembled in the helmet mount. More specifically, the assembly of the pin system 500 is completed by applying a force to the face surface 511 of the release button 510, which is coupled to the actuator 540, which in turn compresses the actuator spring 520, thereby causing the second through hole in the bottom portion 546 of the actuator to extend beyond the back surface 438 of the back plate. Then a dowel pin 550 is inserted with a light interference fit into the second through hole in the bottom portion 546 of the actuator until centered therein, wherein the dowel pin 550 will engage the back surface 438 of the back plate on either side of elongated aperture 436 when the force is removed from the face surface 511 of the release button 510. In other words, the dowel pin 550 prevents bottom portion 546 of the actuator from being pulled back towards the release button 510 when the actuator spring 520 is no longer compressed.

Once the dowel pin 550 is inserted through the bottom portion of actuator 540, the pin system 500 is completely assembled and prepared for use. As noted above, the entire pin system 500 is fixed to the front plate 420 and moves vertically with that plate. The only movement within the pin system itself occurs in a horizontal direction when the release button 510 is compressed, thereby compressing the actuator spring 520 and extending the bottom portion of the actuator 540 beyond the back surface 438 of the back plate 430. This is shown in FIG. 19, where the release button has been compressed, thus compressing the actuator spring and extending the dowel pin beyond the back surface of the back plate. Thus, by compressing the release button 510 and moving the actuator 540 and dowel pin 550 in a horizontal direction, the front plate 420 can be moved up and down. When the release button 510 is no longer compressed, or released, the dowel pin 550 will once again rest against the back surface 438 of the back plate in one of the grooves, thereby holding the front plate and therefore the night vision device against vertical movement. This is shown in FIG. 18, where the release button has not been compressed and dowel pin is resting in one of the grooves in the back plate.

The specific location that the dowel pin 550 rests against the back surface of the back plate is determined by the user, and facilitated by the plurality of grooves 437 that are machined into the back surface 438 of the back plate 430. The dowel pin 550 preferably has a cylindrical shape and has a length and diameter slightly smaller than the length and depth of the grooves 437. As shown in FIG. 21, the grooves 437 preferably have a curved surface with a length and depth that are adapted to allow the dowel pin 550 to rest within any one of the grooves 437. Moreover, the grooves 437 should have a depth that will retain the dowel pin 550 if a force is applied to the front plate 420 or back plate 430 in any direction. In other words, the dowel pin 550 should not be displaced from any one of the grooves unless the pin system 500 has been activated by compressing the release button 510 and then moving the front plate 420 up or down. In addition, the actuator spring 520 should have a spring force that prevents the release button from being compressed by a user's ordinary movement while wearing the helmet mount. The actuator spring preferably has a spring force that allows the release button to be compressed by a single hand of the user, while not being compressed by inadvertent contact to the release button which may occur during use of the helmet mount.

Preferably the grooves 437 have a depth approximately equal to the radius of the dowel pin 550. Accordingly, it is also desirable that compression of the release button will only extend the actuator and dowel pin a distance that is sufficient to extend the dowel pin 550 beyond the grooves and back surface 438.

It is also preferred that the elongated aperture 436 in the back plate 430 have a width only slightly greater than a width of the bottom portion 546 of the actuator 540. Moreover, as shown in FIG. 20, it is preferred that the surfaces of the bottom portion 546 of the actuator where the second through hole is contained have at least one flat and preferably two flats 546a, with one on each side. The flats 546a have a flat surface, as compared to curved. A flat can be on either one or both sides of the bottom portion of the actuator. Likewise, the elongated aperture 436 in the back plate preferably has relatively flat sides along the vertical walls of the aperture. By having the bottom portion 546 of the actuator and the width of the elongated aperture 436 nearly the same, and having both with relatively flat surfaces that are adjacent to each other, the actuator 540 should be prevented from rotating within the elongated aperture 436 so that the dowel pin remains aligned with the grooves.

The number of grooves 437 machined along the length of the elongated aperture 436 in the back plate 430 can vary depending on how much vertical adjustment of the night vision device is desired. In one preferred embodiment, as shown in FIG. 21, the elongated aperture 436 has a length of approximately one inch and there are six grooves 437. It is also preferred that each of the parts of the rack/pin system 400, except for the spring pin, actuator spring, and dowel pin be made from aluminum. Preferably the spring pin, actuator spring, and dowel pin are made from a 300 series stainless steel. However, each of the materials used to make the present invention can be varied, so long as the substituted materials exhibit the necessary properties to sustain the demands of the desired function. For instance, it is preferred that each of the parts of the rack/pin system 400 be made from a material that is strong, non-magnetic, and relatively corrosion resistant. Thus, in addition to using a 300 series stainless steel, one skilled in the art could select other suitable materials, such as a $17/4$ stainless steel. Moreover, because the sizing and proportions of many of the parts can be varied while still achieving the same purpose, many design choices will be available when implementing the rack/pin system.

Vertical Adjustment with Gear Drive System

An alternative preferred embodiment of the flip-up helmet mount allows for vertical adjustment of the night vision device relative to the user's eyes by use of a gear drive system 600. The gear drive system 600, shown in FIGS. 22–24, can be used in place of the rack/pin system 400 described above to achieve vertical adjustment of the chassis 50. Nonetheless, many of the features and concepts of the rack/pin system 400 are relevant to understanding the gear drive system 600. Particularly, the gear drive system 600 also uses a rack 610 comprising a front plate 620 and back plate 630 that are very similar to the rack 410 used in the rack/pin system.

The connections between the front plate 620 and the helmet block 40, and the back plate 630 and the chassis 50 are the same as described above for the rack/pin system, and therefore are not described again in detail. Moreover, the discussion above that explains the parameters for determining movement and direction are the same. Therefore, only the differences between the gear drive system 600 and the rack/pin system 400 are discussed in this section.

Figure 22A:
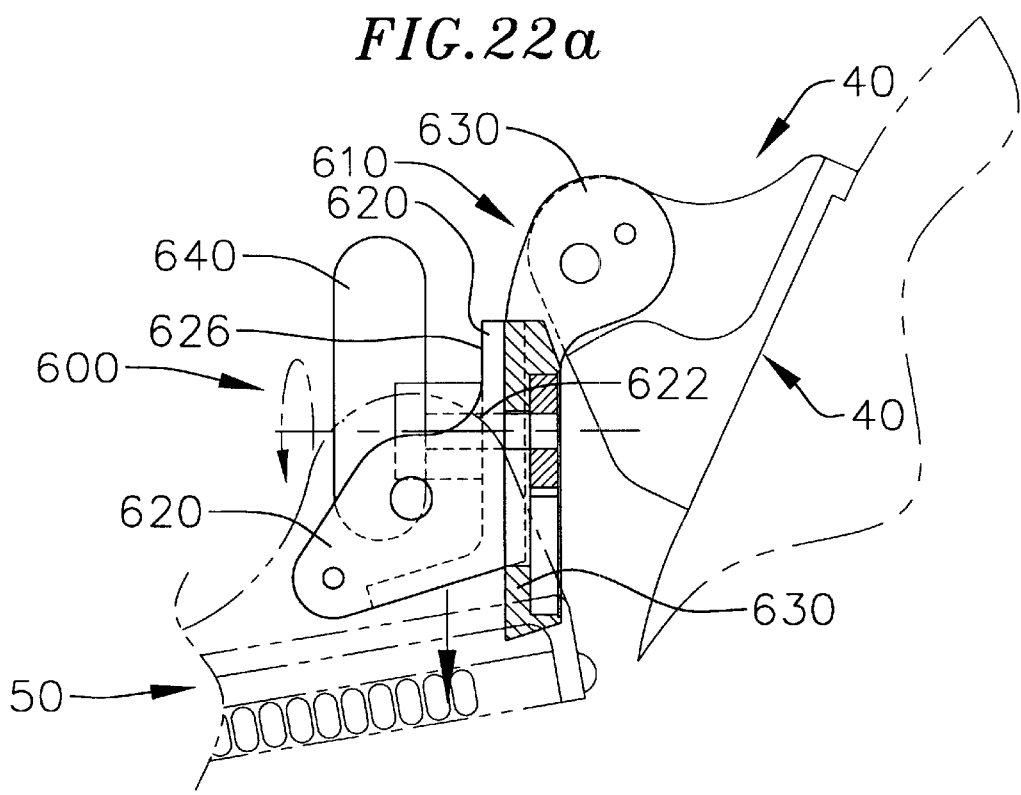
FIG. 22a is a partial cross-sectional side view of a gear drive system in an up position.
Figure 22B:
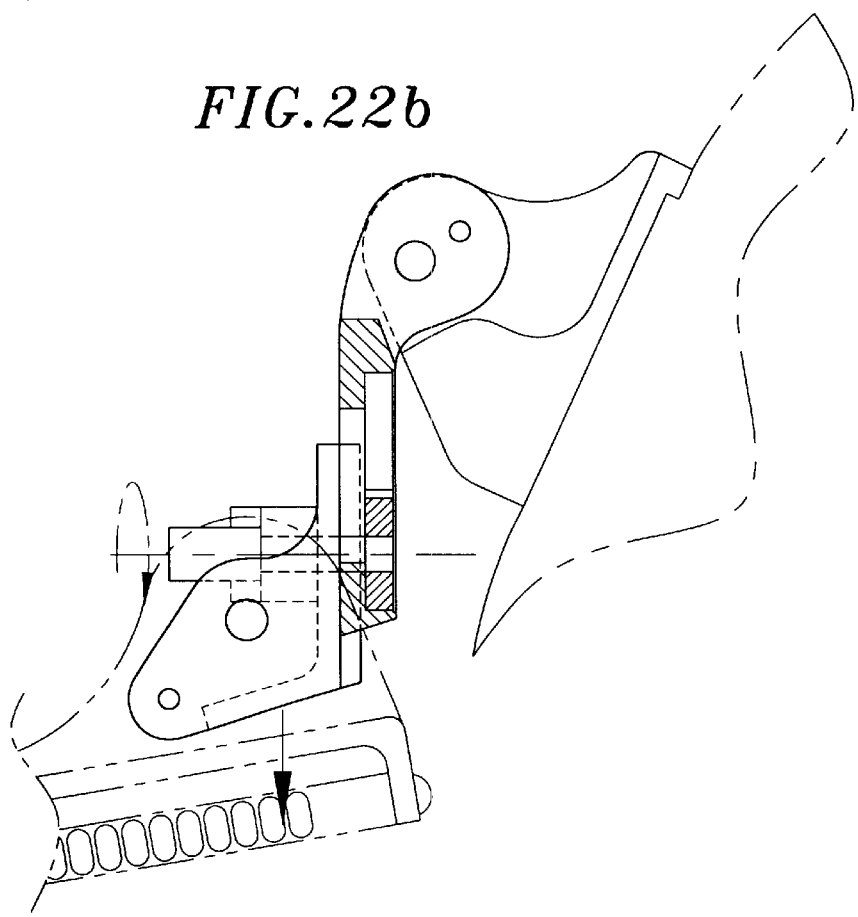
FIG. 22b is is a partial cross-sectional side view of the gear drive system in a down position.
Figure 23A:
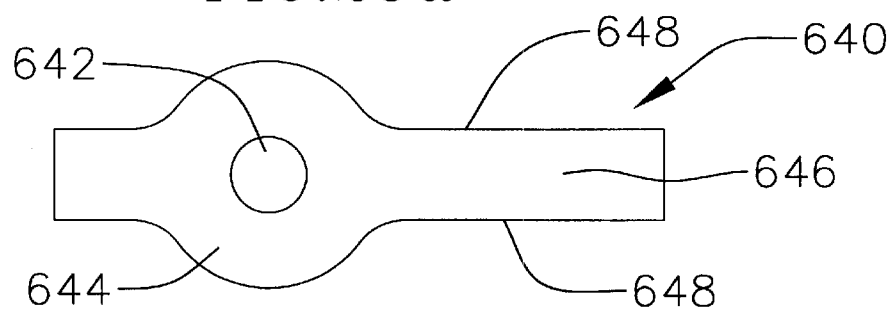
Figure 23B:
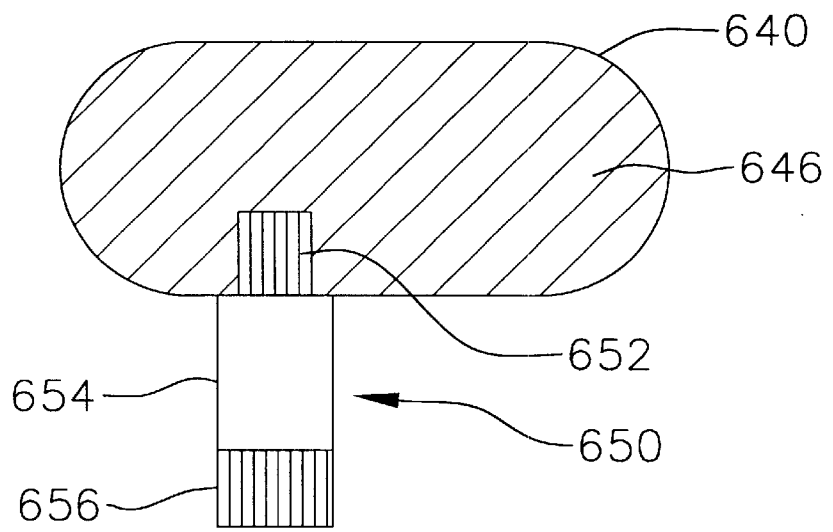
FIG. 23b is a partial cross-sectional side view of the lever with a shaft partially disposed within the lever.
Figure 23C:
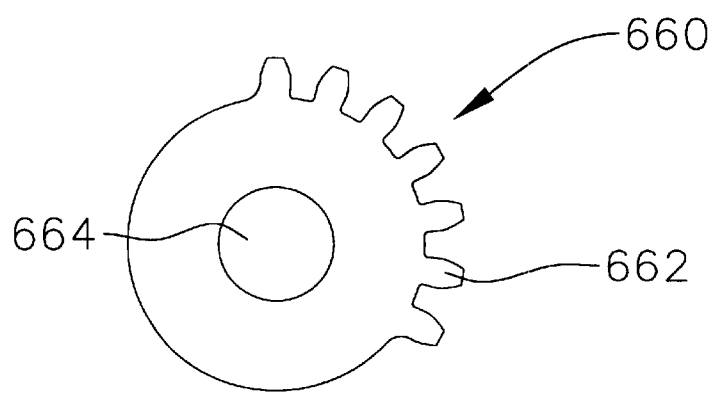
FIG. 23c is an elevation view of the gear of the gear drive system.

As shown in FIGS. 22a and 22b, the gear drive system 600 comprises a rack 610 having a front plate 620 and back plate 630 that are slidably engaged in a dovetail 30 interface, a lever 640, a cylindrical shaft 650 (FIG. 23b), and a partially toothed gear 660 (FIG. 23c). FIG. 22a shows the gear drive system in a up position, while FIG. 22b shows the gear drive system in a down position. The front plate 620 preferably has an integral bushing 622 machined onto a front surface 626 of the front plate. The integral bushing 622 has an aperture through its center that extends through the front plate 620. The shaft 650 is horizontally disposed through the aperture in the integral bushing 622 and front plate 620, and extends through an elongated aperture 636 (FIG. 24a) in the back plate 630. As shown in FIG. 23b, the shaft 650 has a splined top portion 652, a smooth walled body portion 654, and a splined bottom portion 656.

When the shaft is disposed in the front plate, the top splined portion 652 extends out from the integral bushing 622 of the front plate and is adapted for the lever 640 to be disposed over the top splined portion. As shown in FIG. 23a, the lever 640 has a bore 642 in its bottom surface. The bore allows the top splined portion 652 of the shaft to be inserted into the bore 642, as shown in FIG. 23b, thereby creating an interference fit and fixedly coupling the lever to the shaft. The smooth walled body portion 654 of the shaft extends through the integral bushing and front plate 620 and into a portion of the back plate 630. The bottom splined portion of the shaft preferably extends through the back plate to a point substantially flush with a back surface 638 of the back plate.

Lever 640 has a lower domed portion 644 surrounding bore 642. The upper surface of this domed portion transitions into a transverse wing member 646 with opposed gripping surfaces 648. Preferably the wing member is longer to one side of the domed portion so that the gripping surfaces can be more easily manipulated to rotate shaft 650 about its central axis.

Figure 24A:
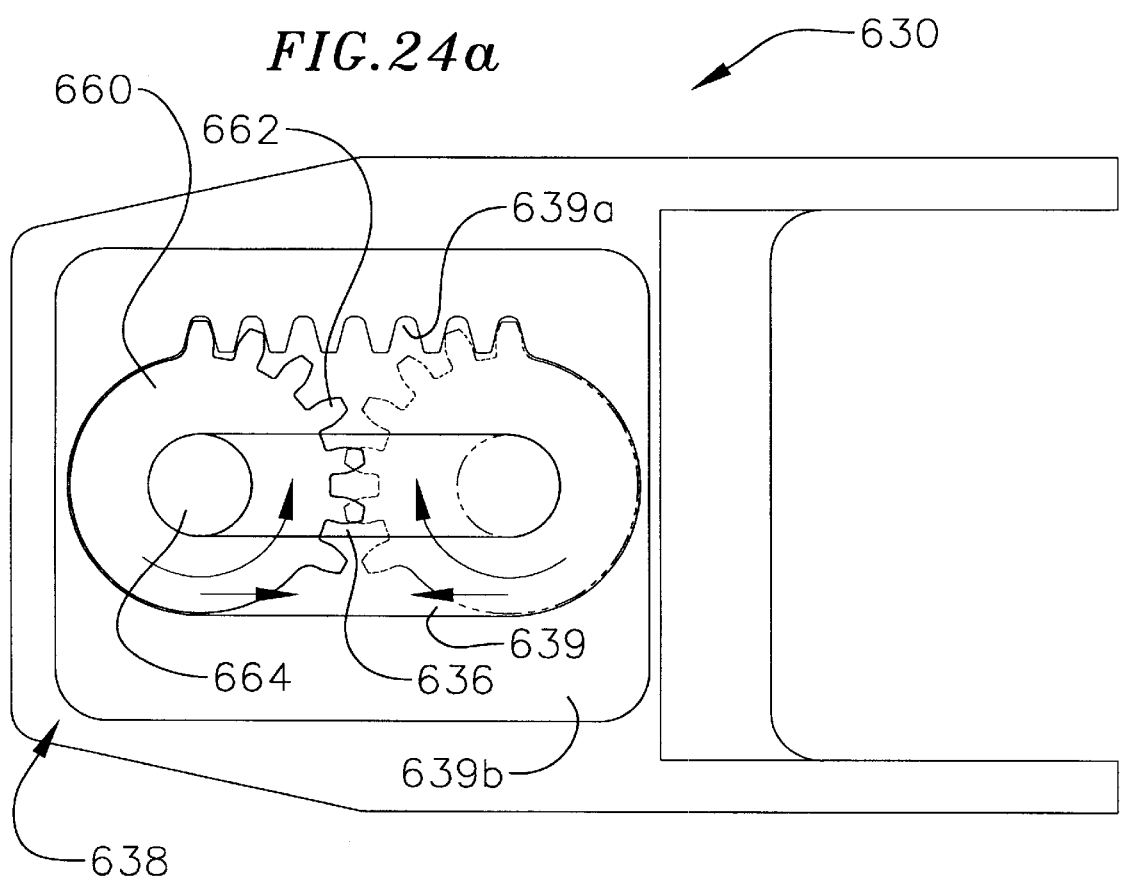
FIG. 24a is a bottom elevation view of the gear drive system showing in phantom the movement of the gear.
Figure 24B:
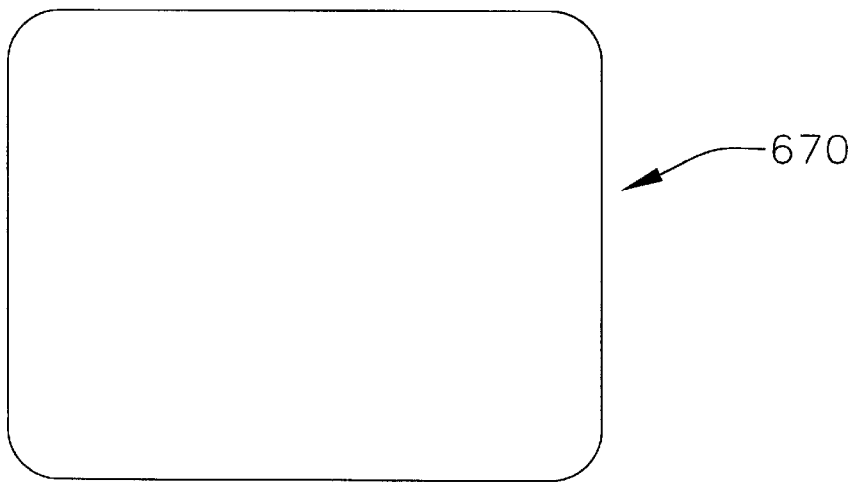
FIG. 24b is an elevation view of the cover plate that covers the gear housing of the gear drive system.

As shown in FIG. 24a, the back surface 638 of the back plate 630 has a gear housing 639 that is adapted to retain the gear 660. The gear housing 639 is a recess in the back plate that unlike the elongated aperture 636 does not extend through the back plate 630 as an aperture. The perimeter of the elongated aperture 636 can instead be seen as a base or floor of the gear housing 639 that the gear 660 rests on. The gear 660 preferably has a generally circular shape wherein its width is much larger than its thickness, and the gear has a through hole 664 in its center. The gear also has a plurality of teeth 662 that outwardly protrude from the perimeter and center. The teeth 662 are adapted to engage a plurality of grooves 639a that are machined into the gear housing 639. Preferably, the back surface 638 also has a thin recess 639b that surrounds the perimeter of the gear housing 639 and has a depth less than the gear housing so that a cover plate 670, as shown in FIG. 24b, can be placed over the gear housing 639 to prevent debris or other objects from entering the gear housing and obstructing the movement of the gear 660.

The through hole 664 of the gear allows the bottom splined portion 656 of the shaft 650 to be forcibly inserted therein to create an interference fit and fixedly couple the gear 660 to the shaft 650. When the gear and shaft are coupled, the gear 660 can be rotated to move up and down within the gear housing 639, through engagement of the teeth with the grooves, by rotating the lever 640, which is likewise coupled to the shaft 650. Preferably the gear 660 will have a rotational range of approximately 120 degrees and vertical travel of approximately 0.6 inches. The movement of the gear within the gear housing is shown in FIG. 24a. The gear in phantom, shown towards the right of the figure, represents the gear in a vertically upward position, while the solid gear towards the left represents the gear in a vertically downward position.

A user of the night vision device can adjust the vertical placement of the night vision device by gripping and turning the opposed gripping surfaces of lever 640 mounted to the front plate 620, which in turn rotates the shaft 650 that is coupled to the gear 660. When the shaft 650 rotates the gear 660 rotates which causes the teeth 664 of the gear to engage the grooves 639a of the gear housing 639, which results in the gear 660 moving up and down within the gear housing 639. Therefore, the up and down movement of the gear 660 within the gear housing 639 means that the vertical position of front plate 620, the chassis 50 and night vision device are all adjusted when the user turns or rotates the lever 640. An advantage of this embodiment is the wide range of vertical positions available for the user to select by rotating the lever. Unlike vertical adjustment achieved by the rack/pin system, which has a fixed number of grooves within which the dowel pin can be positioned, the gear drive system has an infinite number of adjustment points within its range.

The gear preferably has seven teeth 662, while the gear housing has seven grooves 639a. It is desirable to place a lubricant, such as an oil, within the gear housing to facilitate a fluid movement of the gear within the gear housing when the lever is rotated. Enough friction, however, should be provided between the gear and gear housing to prevent inadvertent movement and undesired change in vertical position of the night vision device due to ordinary use forces applied to the night vision device, such as those encountered when a user jumps or runs briskly. The gear is preferably made from a % nylon, but can be made from any other material such as a metal, e.g. bronze, brass, stainless steel or alloys thereof, or possibly another plastic that has a sufficient shear strength to prevent the teeth from breaking off when the night vision device is jolted or bumped. In addition, as noted above, the materials used to make each of the parts, as well as their sizing, can be varied while still achieving the same purpose. Nonetheless, it is preferred that the parts of the gear drive system be made of aluminum, except for the nylon gear and the shaft, which is preferably made from a 300 series stainless steel.

Locking Flip Up/flip Down Mechanism

Figure 25:
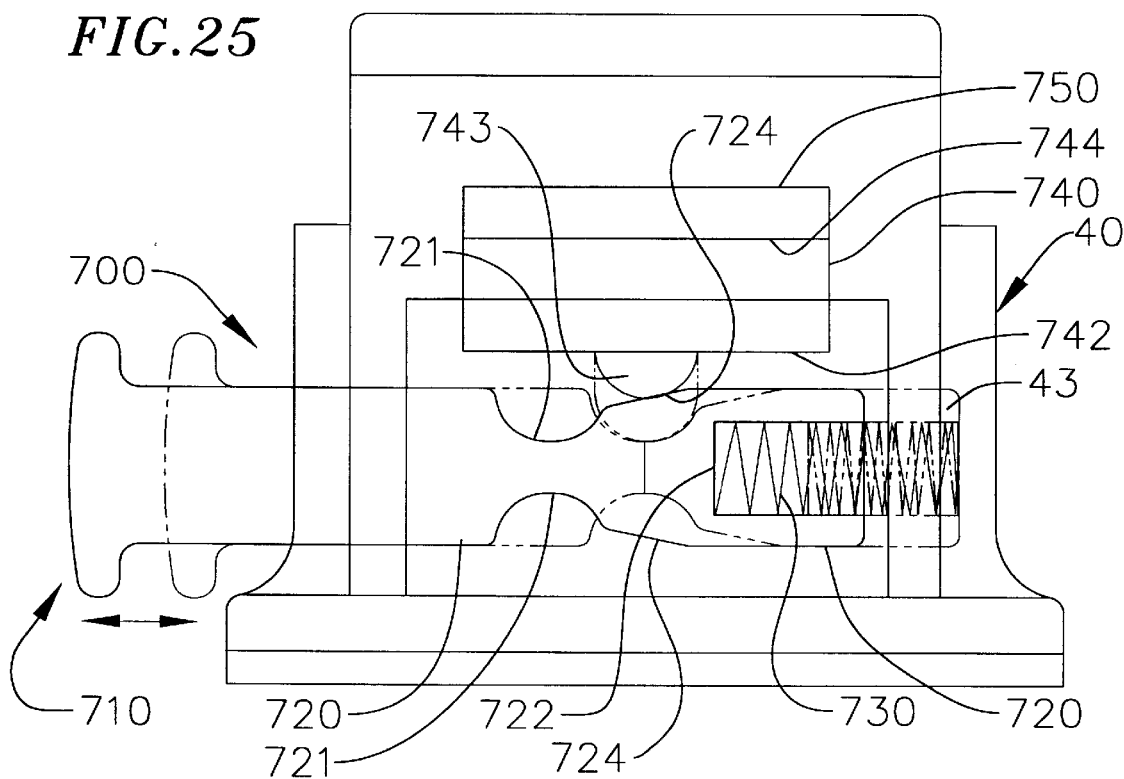
FIG. 25 is a cross-sectional view of a locking mechanism showing phantom movement of the shaft and spring.
Figure 27:
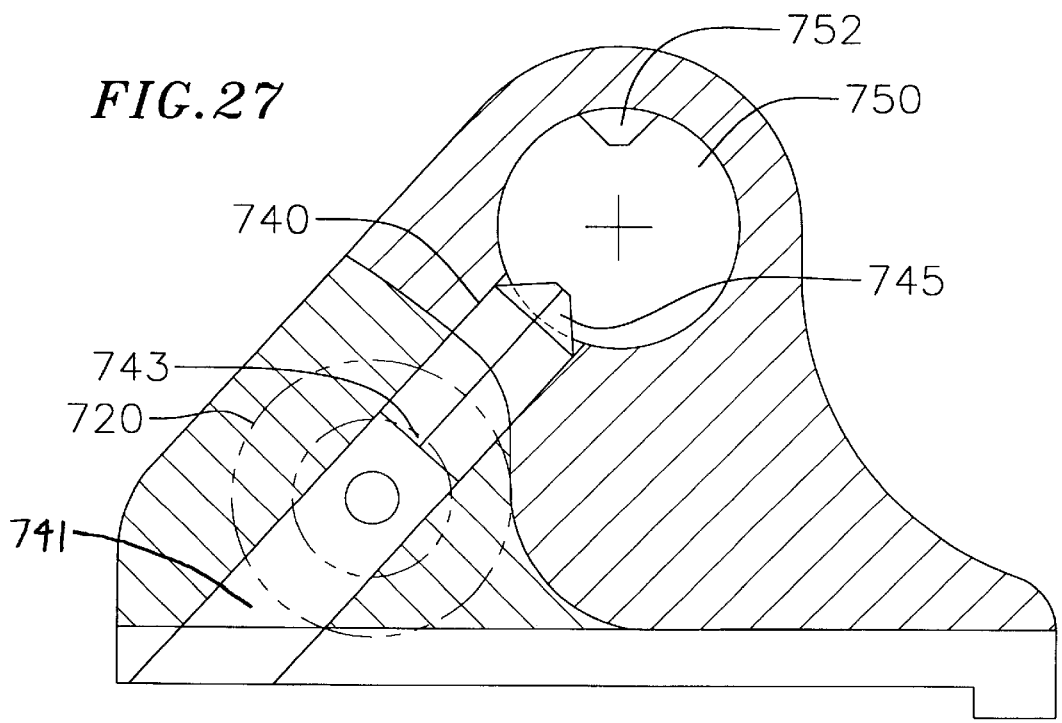
FIG. 27 is a cross-sectional side view of the helmet block showing the locking mechanism of FIG. 25.

Another preferred embodiment of this invention includes a locking mechanism 700 that allows the night vision device to be locked in either the stowed position or the use position, but still be easily moved from the stowed position to the use position by activating the locking mechanism. Such a mechanism is useful to avoid inadvertent activation or deactivation of the night vision device during rough use. As shown in FIGS. 25–27, the locking mechanism 700 is generally positioned inside the helmet block 40, and has an activation button 710 at an end of a shaft 720 that protrudes horizontally outward from a side of the helmet block.

The activation button 710 is preferably an integral part of a shaft 720 which is disposed within a blind aperture 43 in the helmet block. Thus, pushing and moving inward the activation button 710 causes the shaft 720 to move an equal distance inside the helmet block. The shaft 720 has a generally cylindrical shape with an interior bore 722 extending partially down its length from an end opposite the activation button 710. A spring 730 is partially disposed within the interior bore of the shaft and rests between an inside wall of the helmet block at the blind end of the aperture and the end wall of the interior bore of the shaft. As shown in FIG. 25, pushing in the activation button 710 towards the helmet block 40 compresses the spring 730 in the blind aperture thereby causing a greater portion of the shaft 720 to become disposed within the helmet block.

A lock 740 and a pivot sleeve 750 are also disposed within the helmet block.

The lock 740 is positioned between the shaft 720 and the pivot sleeve 750 and has a generally rectangular shape. The lock has with a rear surface 742 that faces the shaft 720, and a wedge surface 744 that contacts the pivot sleeve 750. As shown in FIGS. 26a and 26b, the rear surface 742 of the lock preferably has a rounded protruding bearing surface 743 that contacts the shaft, while the wedge surface 744 preferably has a protruding angled face 745.

The lock 740 is designed to move up and down between the shaft 720 and the pivot sleeve 750, depending on how the bearing surface 743 and wedge surface 744 are positioned along the shaft and pivot sleeve. More particularly, the position of the lock 740 changes in response to the activation button and shaft 720 being pushed in, and depending on how the pivot sleeve 750 is rotated.

The night vision device will normally be in one of three positions at any given time: (1) stowed, (2) in use, or (3) in between stowed and in use. When the night vision device is in either the stowed or in use position, the shaft 720 is preferred to be in a locked position. When the night vision device is neither stowed nor in use, but rather in between one of those positions, the shaft is preferred to be in an unlocked position. Accordingly, when the shaft 720 is in the locked position the lock 740 should be engaged, while when the shaft 720 is in the unlocked position the lock 740 should be disengaged. Therefore, the night vision device will move freely between being flipped up or down from the stowed or in use positions when the shaft 720 is in the unlocked position and the lock 740 is disengaged. However, once the shaft 720 is in the locked position, i.e. in either the stowed or use positions, the shaft 720 will not move, but can be changed to the unlocked position by pressing in the activation button 710.

Referring to FIG. 25, the protruding bearing surface 743 of the lock remains in contact with the shaft 720 throughout the locking and unlocking transition. What changes, however, is the precise position on the shaft 720 where protruding bearing surface 743 makes contact. The portion of the shaft between the activation button and the end wall of the interior bore, which is disposed within the helmet block, has an outer surface that varies in diameter along the length that contacts the protruding bearing surface of the lock. Moving away from the activation button down the length of the shaft, the shaft transitions from having a cylindrical outer surface at a diameter just less than that of the blind aperture to an inwardly curving concave surface 721 dimensioned to receive the bearing surface of the lock. The shaft then transitions to an outwardly tapered surface 724 until it again reaches its outer cylindrical diameter over the interior bore. When the shaft has not been moved inward by pressing the activation button, and thus the shaft is biased to the locked position by the spring 730, the protruding bearing surface 743 rests against the outwardly tapered surface 724 of the shaft. When the shaft 720 is pressed in against the spring 730, however, the narrow diameter concave surface 721 becomes the position where the protruding bearing surface of the lock makes contact with the shaft.

When the protruding bearing surface 743 makes contact with the outwardly tapered surface 724 of the shaft, the result is that the lock 740 raises its vertical position with respect to the pivot sleeve 750, which in turn increases the amount of friction between the pivot sleeve 750 and the lock 740. That is, the force of the spring 730 is transmitted through the tapered surface to press the wedge surface of the lock against the outer surface of the pivot sleeve. More particularly, referring to FIG. 27, the pivot sleeve 750 has a pair of detents 752 in its outer surface that are preferably separated by about 180 degrees on the cylindrical body of the pivot sleeve. When the lock 740 is engaged, the angled face 745 of the lock may be engaged in one of the detents 752 which have a configuration adapted to receive the angled face of the lock by rotating the night vision device and therefore the pivot sleeve. Once in such a position, the pivot sleeve is prevented from rotating. The engagement between the angled face of the lock and the detents 752 results in the pivot sleeve 750 being locked in place and the protruding bearing surface of the lock pressing against the outwardly tapered surface of the shaft, wherein the night vision device will not freely move from the stowed or in use position. Accordingly, the ability to change the position of the night vision device requires that the shaft 720 be compressed inward, that the protruding bearing surface 743 of the lock 740 be lowered into the concave surface 721 of the shaft, which in turn causes the angled face 745 of the lock to be removed from one of the detents 752 of the pivot sleeve 750, so that the pivot sleeve is free to rotate when the user attempts to change the night vision device from either the stowed or in use position.

Once the shaft 720 has been compressed in and the angled face of the lock is in contact with a surface of the pivot sleeve other than the detents 752, the activation button 710 of the shaft will remain pushed in and remain in the unlocked position. The protruding bearing surface 743 of the lock holds the activation button and the shaft in the compressed position because the protruding bearing surface is held down in the concave surface by the lock pressing against the outer surface of the pivot sleeve, which prevents the spring 730 from forcing the shaft 720 back out from the compressed position. The outer surface of the pivot sleeve will continue to hold the shaft in the compressed position until the angled face of the lock again engages one of the detents of the pivot sleeve. When the angled. face is not engaging a detent 752 it is pressing against a non-detent surface of the pivot sleeve 750, which causes the lock to apply a greater force against the shaft 720. Therefore, it is only after the night vision device has been rotated to either the stowed or in use position that the angled face of the lock 740 will again move into one of the detents 752, which allows the lock to move vertically toward the pivot sleeve and away from the shaft, which decreases the amount of pressure the protruding bearing surface 743 of the lock is applying to the shaft 720, thereby allowing the spring 730 to press out the shaft and activation button 710.

The shaft is retained in the helmet block during all positions of the night vision device by the lock. Even when the angled face of the lock is engaged in a detent of the pivot sleeve, the protruding bearing surface of the lock applies pressure against the shaft. The diameter beyond the outwardly tapered surface of the shaft, which is the same diameter as the portion of the shaft where the interior bore is positioned, is great enough that the shaft. could not pass the protruding bearing surface if the activation button were pulled outward away from the helmet block. Therefore, the position of the shaft 720 with respect to the protruding bearing surface is either having the protruding bearing surface within the concave surface 721 or having the protruding bearing surface against the outwardly tapered surface 724. In either position, the shaft 720 will be retained within the helmet block.

In constructing the locking mechanism, the preferred method of assembly includes first inserting the lock into a blind bore 741 (FIG. 27) in the helmet mount that is designed to receive the lock 740. Next, the spring is placed partially within the interior bore 722 of the shaft, and the shaft and spring are inserted into the helmet block at a position that is below the lock. At this point the protruding bearing surface of the lock is facing the shaft. Next, the activation button and shaft are compressed, thereby allowing the protruding bearing surface of the lock to drop into the concave surface 721 of the shaft. While continuing to compress the activation button and shaft, so that the lock remains in a lowered vertical position, the pivot sleeve is inserted into the helmet block at a position above the lock. The pivot sleeve is then rotated until one of the detents of the pivot sleeve engages the angled face of the lock, which allows the spring to press the shaft and activation button outward, thereby resulting in the protruding bearing surface of the lock resting against the outwardly tapered surface 724 of the shaft. The assembly of the locking mechanism is then complete, having the activation button and shaft in the locked position and the lock engaged.

As with the other embodiments of this invention, the sizing and materials used to construct the locking mechanism can be varied, while still achieving the same purpose. The preferred material for each of the parts is aluminum, with the exception of the spring which is preferably made from a 300 series stainless steel.

Lower Socket with Break Away Latch

As mentioned above, the upper socket 353 and lower socket 354 form an adjustable socket assembly for mounting the night vision device to the helmet mount. Specifically, as shown in FIGS. 9a and 9b, the goggle horn 315 is slidable into the adjustable socket assembly and locks over the detent 355 of the lower socket. The night vision device has a lever for removing the device from the socket assembly. An additional embodiment of this invention, however, provides for a break away latch assembly 370 that allows the night vision device to separate from the socket assembly when certain forces are applied to the night vision device.

The features of the lower socket 354 are generally the same as those described above and shown in FIGS. 9a, 9b, 10a–10c, 11, 12a and 12b. The structure of the lower socket with respect to the contacting surface 357, the sloping inner walls 356, cylindrical holes 358, goggle horn receiving area 357a and the tapered recess formed between the upper and lower sockets are the same for this embodiment as described above. The difference is that the detent 355 is replaced with a break away latch assembly 370, and therefore only these features and the modifications to the lower socket needed to accommodate the new assembly are discussed in this section of the description.

Figure 28A:
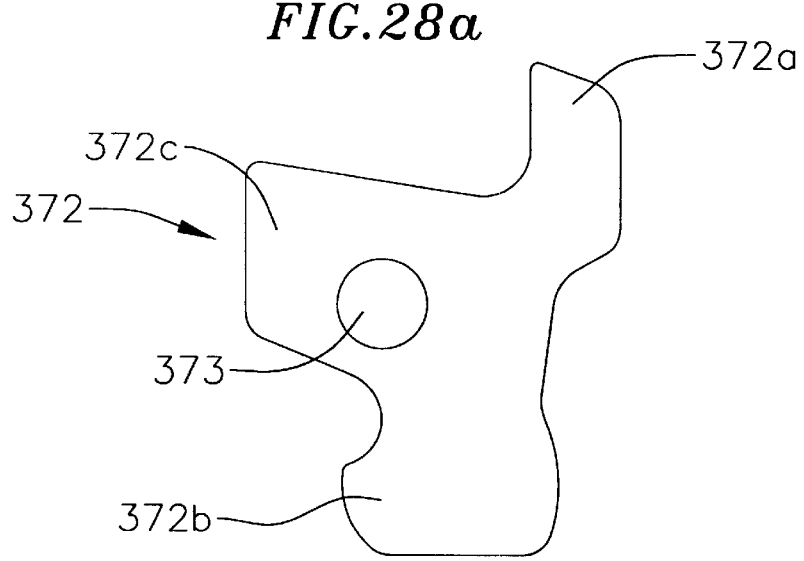
FIG. 28a is a cross-sectional side view of the latch of a break away latch assembly.
Figure 28B:
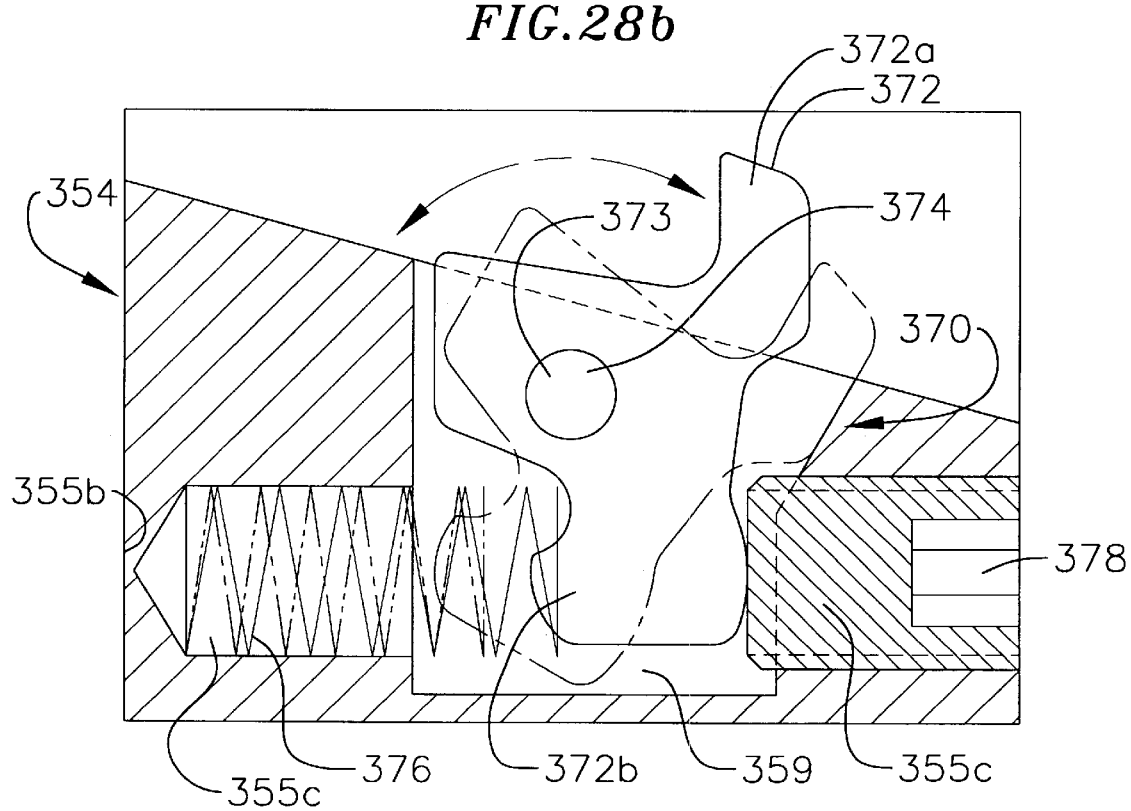
FIG. 28b is a cross-sectional side view of the break away latch assembly showing phantom movement of the latch and spring.

Referring to FIGS. 28a and 28b, the break away latch assembly 370 comprises a latch 372, a pivot pin 374, a spring 376, and an adjusting screw 378. The latch 372 is partially disposed within the bottom inner wall of the lower socket, wherein the latch has a protruding detent surface 372a that appears to be identical to the detent 355 discussed above. However, unlike the detent 355, the latch 372 and thereby detent surface 372a is adapted to pivot, or unlatch. When the detent 355 is used in the lower socket, the night vision device is locked into the socket assembly, and if a great enough force is applied to the night vision device, the night vision device will break away from the goggle horn 315. When this occurs, the night vision device cannot be easily placed back onto the helmet mount because the goggle horn is broken. Therefore, the break away latch assembly 370 allows the goggle horn 315 to break away from the socket assembly so that the night vision device and goggle horn are still coupled and capable of being re-mounted to the helmet mount.

Figure 29A:
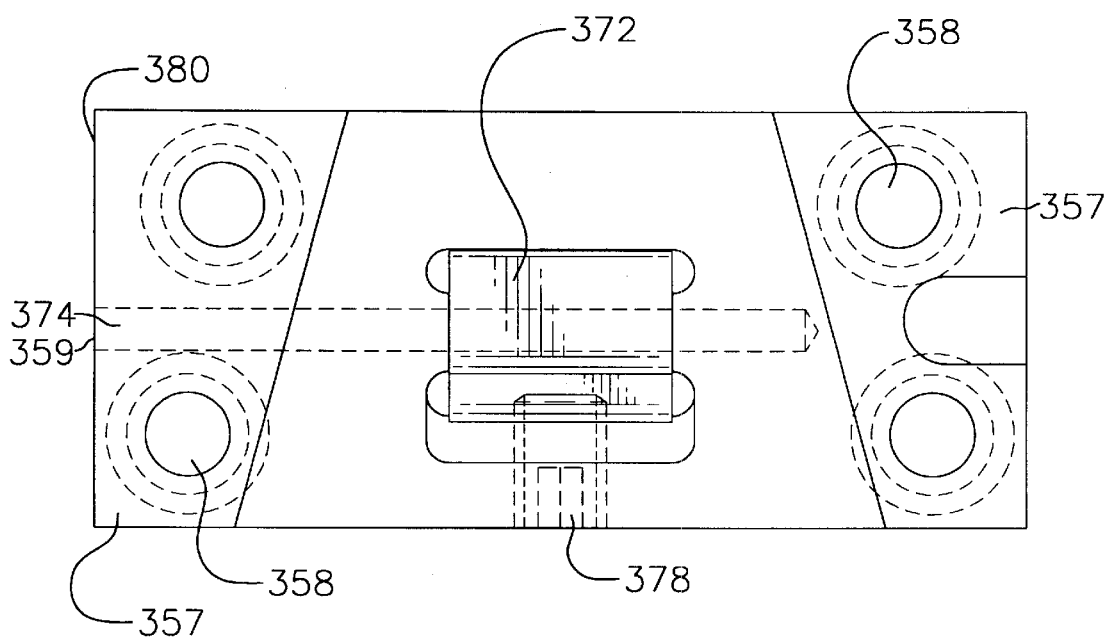
FIG. 29a is a top elevation view of the lower socket of the break away latch assembly.
Figure 29B:
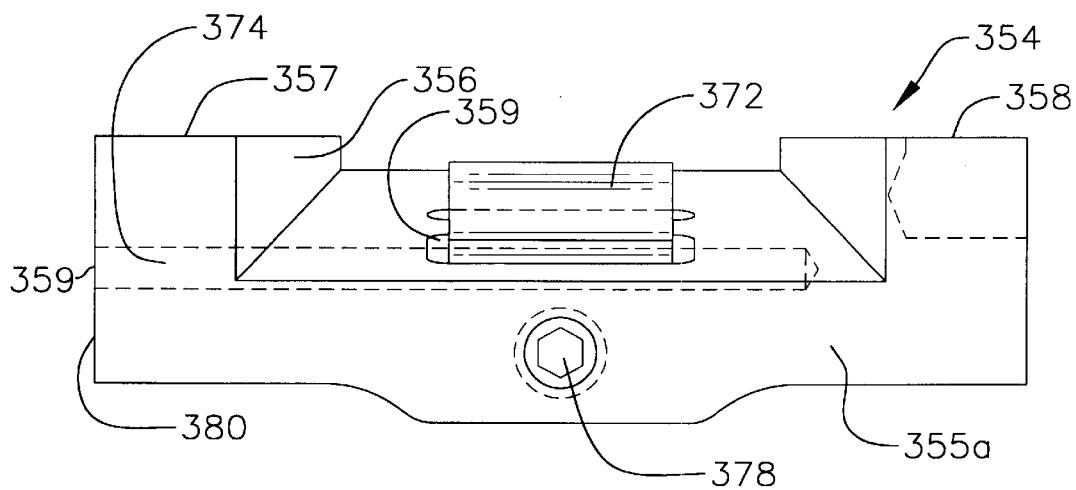
FIG. 29b is a front elevation view of the lower socket of the break away latch assembly.

In addition to the upwardly extending detent portion 372a, latch 372 has a central body portion 372c and a downwardly extending activator portion 372b. As shown in FIGS. 29a and 29b, the latch 372 is pivotally disposed in an upright position within a recess 359 in the bottom inner wall of the lower socket, and is retained therein by the pivot pin 374 that is positioned with an interference fit in a through hole in a side surface 380 of the lower socket. The side surface is adjacent and perpendicular to the contacting and bottom surfaces of the lower socket. The through hole in the side surface is machined at a position that is approximately in the middle of the side wall between the two cylindrical holes 358 positioned at each end of the lower socket, and the through hole runs perpendicular to the holes 358 such that the pivot pin 374 when received in the hole will extend substantially underneath and across the contacting surface 357. It will also align and have a non-interference fit with a hole 373 extending through the central body portion of the latch 372 when the latch is received in recess 359. Referring to FIG. 29b, the pivot pin is positioned below sloping inner walls 356 and retains the latch within the lower socket at a point below a top surface 372a of the latch detent. The pivot pin 374 could either be a solid pin or a roll pin, and is preferably made of stainless steel. As the hole 373 of the latch has a diameter slightly larger than that of the pivot pin, the latch is able to pivot about the pivot pin.

Referring to FIG. 28b, a blind bore 355c extends inwardly from the front surface of the lower socket below the sloping inner wall. It intersects and goes beyond recess 359 but stops before it reaches the back surface 355b of the lower socket. A coil spring 376 is received in the portion of the blind bore beyond the recess. The spring rests between the activator portion 372b of the latch and a back surface 355b of the lower socket. The spring is adapted to compress when the latch is subjected to a force that causes the latch to pivot around the pivot pin 374. Generally, the latch is in a latched position, wherein the detent surface 372a of the latch has an approximately 90 degree vertical position in relation to the bottom of the lower socket. The latch is designed to be able to pivot or unlatch against the force of the spring, and when doing so, the vertical position of the detent surface moves approximately 2 to 10 degrees toward a front surface 355a of the lower socket, which is also toward the night vision device. This pivotal movement of the latch is shown by the phantom designation of the latch and spring. When the latch moves to the unlatched position the goggle horn 315 will be separated from the socket assembly.

The spring is preferably selected so that the latch will only become unlatched when a force is applied to the night vision device that is just below that which would otherwise cause the goggle horn to break away from the night vision device. As mentioned, without the break away latch assembly 370, the goggle horn would remain in the socket assembly if the night vision device is subject to such an impact that causes the device to break away from the goggle horn. Accordingly, the latch will not unlatch if the impact to the night vision device was minor or of a type encountered during typical use of the night vision device. For example, inadvertent bumping by the user's arm would not typically break the goggle horn away from the night vision device in the previous embodiment, and thus also should not unlatch the latch assembly 370.

The break away latch assembly 370 is designed to have the goggle horn and night vision device break away, and thus unlatch the latch, at approximately 80% to 90% of a predetermined impact that would typically break the night vision device from the goggle horn. At 80% to 90% of such an impact, the goggle horn will force the latch to pivot from the latched position to the unlatched position, and the goggle horn will be removed from the socket assembly. Thus, before the night vision device breaks away from the goggle horn due to an impact to the night vision device, the break away latch assembly 370 will allow the goggle horn and night vision device to remain intact by exiting the lower socket. The user of the night vision device can then re-insert the goggle horn into the socket assembly. This break away latch system 370 of the lower socket not only prevents the night vision device from breaking, but also helps prevent the user from being injured. Because the night vision device is mounted to the user's helmet, it is desirable for the night vision device to separate from the helmet at a predetermined impact rather than forcing the user's neck and head to absorb the shock impact that is required to actually break the goggle horn away from the night vision device.

Moreover, the position of the latch 372 within the tapered recess formed between the lower socket and upper socket can be adjusted by rotating an adjusting screw 378. Adjusting the position of the latch changes the precise fit between the goggle horn that is being placed over the extending detent portion 372a of the latch. The adjusting screw preferably is able to change the position of the latch by $20/1000$ of an inch. As shown in FIGS. 28b and 29b, the adjusting screw 378 is preferably disposed through the front surface 355a of the lower socket into a threaded front portion of blind bore 355c, and is designed to press against a portion of the latch that is positioned below the bottom inner wall of the lower socket and thereby change the position of the detent surface. Should alignment in of the latch by a user in the field not be desired, the adjusting screw can be locked in position by an adhesive or by using a self-locking screw that maintains its position.

Figure 30A:
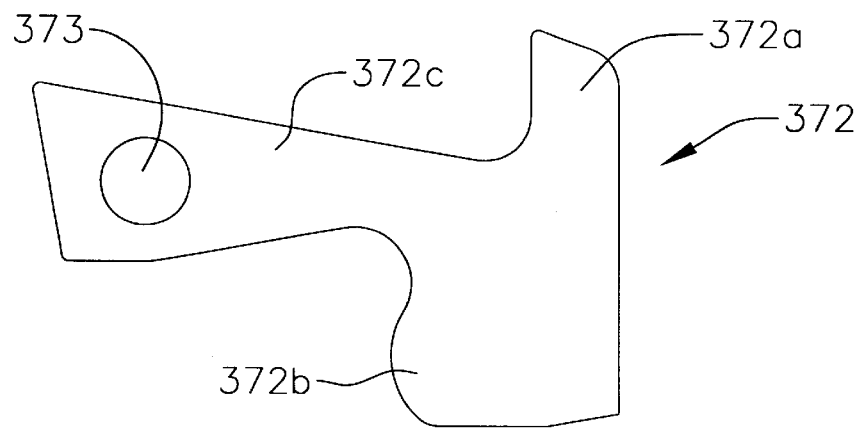
FIG. 30a is a cross-sectional view of the latch of an alternative break away latch assembly.
Figure 30B:
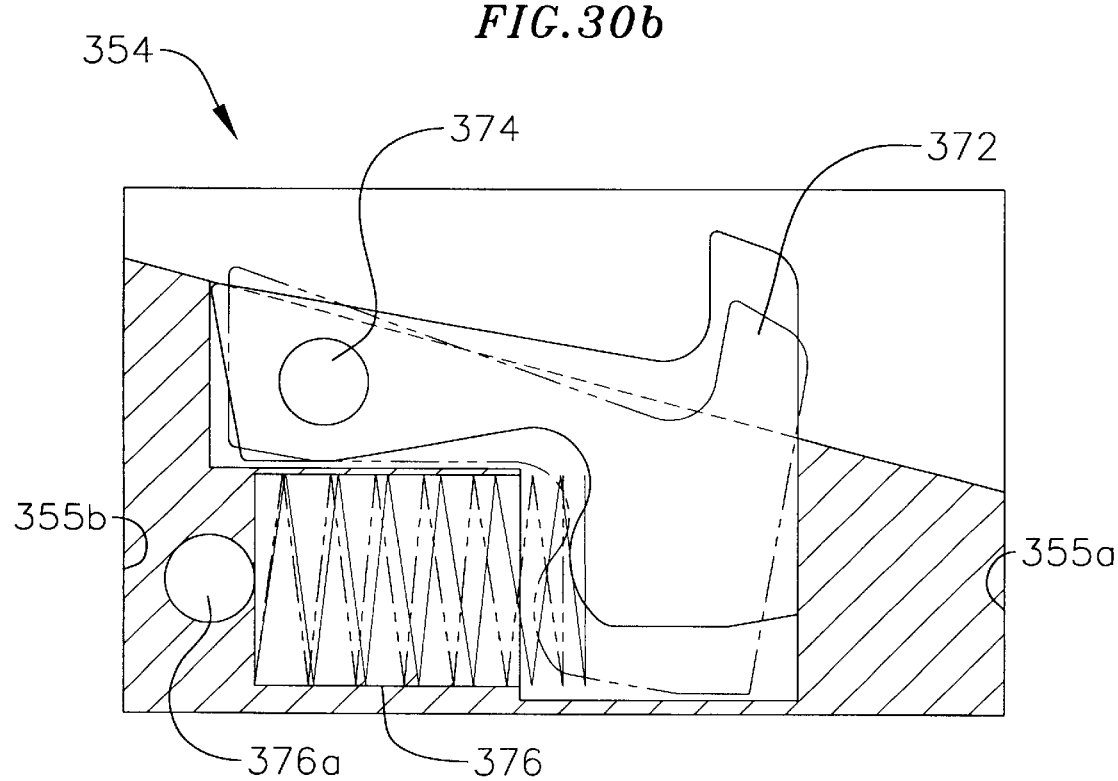
FIG. 30b is a cross-sectional view of the alternative break away latch assembly showing phantom movement of the latch and spring.
Figure 31A:
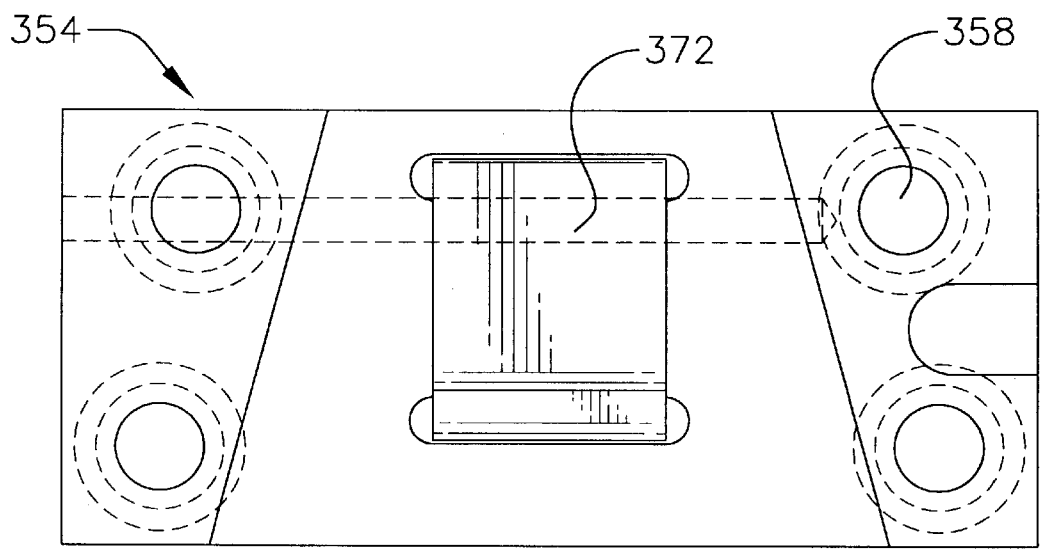
FIG. 31a is a top elevation view of the lower socket of the alternative break away latch assembly.
Figure 31B:
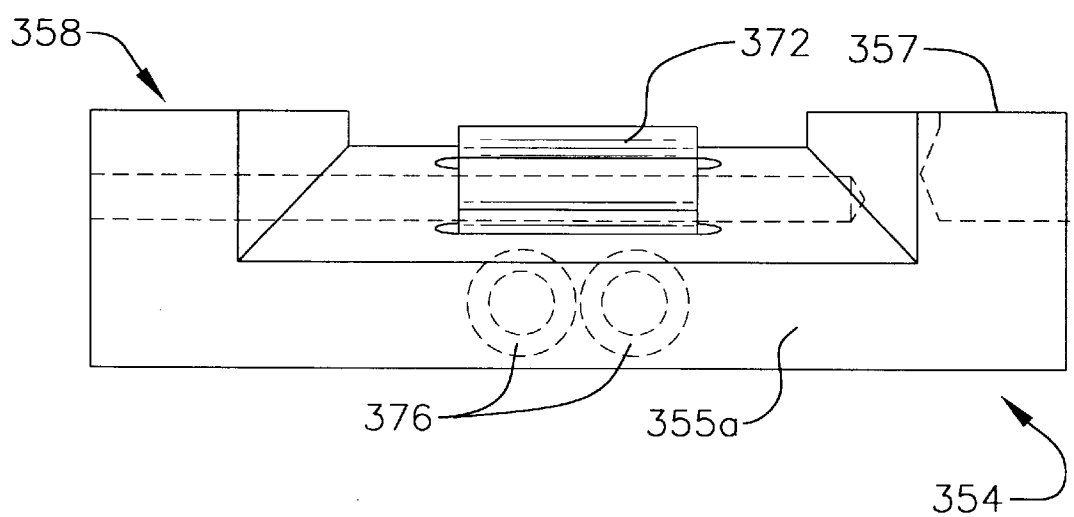
FIG. 31b is a front elevation view of the lower socket of the alternative break away latch assembly.

An alternative embodiment to the break away latch system 370 is shown in FIGS. 30a, 30b, 31a and 31b. The alternative embodiment makes use of two springs 376, as opposed to the single spring design, and eliminates altogether an adjustment screw. When using a double spring design, there is no adjusting screw 378 disposed through the front surface of the lower socket. Instead, as shown in FIG. 31b, two springs 376 are inserted through the back surface of the lower socket. As shown in FIG. 30b, the two springs 376 are retained within the lower socket by a spring retaining pin 376a, which runs parallel to the pivot pin 374 in a hole machined along the back surface 355b of the lower socket. It has an interference fit in the hole. The use of two springs 376 is the presently preferred embodiment because it allows for a greater pre-determined impact needed to pivot the latch 372 and thus allow the goggle horn to break away from the socket assembly.

While various embodiments of this invention have been shown and described, it would be apparent to those skilled in the art that many more modifications are possible without departing from the inventive concept herein. For example, although the adjustment assemblies have been illustrated on one side of the helmet mount, it should be realized that the assemblies could easily be located on either side of the helmet mount. In other words, the helmet mount could be designed for one-handed operation by either the right or left hand of the user. It is, therefore, to be understood that within the scope of the appended claims, this invention may be practiced otherwise than as specifically described.

What is claimed is:

1. A helmet mount for a night vision device comprising:
    a helmet block adapted to secure the helmet mount to a helmet;
    a chassis adapted to receive the night vision device;
    a rack system adapted to extend between the helmet block and the chassis; and means for adjusting only a vertical position, and not a horizontal position, of the night vision device relative to a user's eyes, wherein the chassis moves vertically on the rack system relative to the helmet block.

2. The helmet mount of claim 1 wherein the means for adjusting the vertical position of the night vision device relative to the user's eyes comprises:
    a pin system mounted to the rack system, wherein the pin system has a release button positioned adjacent to a front surface of the rack system and a dowel pin positioned adjacent to a back surface of the rack system that is adapted to engage the back surface to keep the chassis stationary, wherein compressing the release button extends the dowel pin away from the back surface so that the chassis can be moved vertically relative to the helmet block.

3. The helmet mount of claim 2 wherein the back surface has a plurality of horizontal grooves positioned vertically adjacent each ocher and adapted to receive a rounded surface of the dowel pin, such that the dowel pin moves within one of the grooves when the dowel pin contacts a surface between adjacent grooves.

4. The helmet mount of claim 2 further comprising an actuator disposed between the front surface and the back surface, and connecting to the release button at a first end and connecting to the dowel pin at a second end opposite the first end, such that compressing the release button in a horizontal direction towards the front surface extends the actuator and the dowel pin an equal distance in the horizontal direction away from the back surface.

5. The helmet mount of claim of claim 2 wherein the rack system comprises a front plate that is coupled to the chassis and a back plate that is coupled to the helmet block, wherein the front plate and the back plate are slidably connected in a double dovetail interface, wherein a pair of parallel ridges in the front plate slidably engage a pair of recesses in the back plate.

6. A helmet mount for a night vision device comprising:
    a helmet block adapted to secure the helmet mount to a helmet;
    a chassis adapted to receive the night vision device;
    a rack system adapted to extend between the helmet block and the chassis; and means for adjusting a vertical position of the night vision device relative to a user's eyes, wherein the chassis moves vertically on the rack system relative to the helmet block;
    wherein the means for adjusting the vertical position of the night vision device relative to the user's eyes comprises:
        a gear drive system mounted to the rack system, wherein the gear drive system has a lever positioned adjacent to a front surface of the rack system and a gear positioned within a back surface of the rack system, wherein rotating the lever rotates the gear so that the vertical position of the chassis is changed.

7. A flip-up helmet mount for a night vision device, the flip-up helmet mount comprising:
    a helmet block adapted to secure the flip-up helmet mount to a helmet;
    a chassis adapted to receive the night vision device;
    a bracket adapted to extend between the helmet block and the chassis, and rotatably couple the chassis to the helmet block; and
    a locking mechanism to adjust the night vision device from a stowed position to a use position, wherein the locking mechanism comprises
        an activation button protruding from an outer surface of the helmet block and integrally coupled to a shaft disposed within the helmet block, and a lock mounted within the helmet block having a bearing surface in contact with a first portion of the shaft, wherein pushing the activation button in a longitudinal direction compresses a spring resting between the shaft and an inside wall of the helmet block in the longitudinal direction, such that the bearing surface of the lock moves from the first portion of the shaft, which disengages the lock so that the night vision device can be moved from either the stowed position or the use position.

8. An adjustable socket assembly for mounting a night vision device comprising:
    an upper socket and a lower socket adapted to be coupled together and mounted to a chassis for receiving the night vision device;
    a recess formed between the upper socket and the lower socket for receiving a goggle horn coupled to the night vision device; and
    a break away latch assembly mounted within the lower socket that allows the goggle horn to be removed from the socket assembly when a certain force is applied to the night vision device.

9. The adjustable socket assembly of claim 8 wherein the break away latch assembly further comprises:
    a latch pivotally secured within the lower socket and protruding from a bottom wall of the lower socket towards the upper socket, wherein the latch is adapted to engage the goggle horn; and at least one spring mounted within the lower socket which presses against the latch so that the latch pivotally moves when a pre-determined impact is applied to the night vision device, which disengages the goggle horn from the latch and socket assembly.

10. A helmet mount for a night vision device comprising:

means for securing the helmet mount to a helmet;

means for receiving the night vision device within the helmet mount;

means for independently vertically adjusting the night vision device relative to a user's eyes while the helmet mount is secured to the helmet and the night vision device is received in the helmet mount, wherein only a vertical position of the night vision device can be adjusted by said means.

11. The helmet mount of claim 10 wherein the means for securing the helmet mount to the helmet is a helmet block;

the means for receiving the night vision device within the helmet mount is a chassis mounted to a rack system; and the means for vertically adjusting the night vision device relative to the user's eyes comprises:
 the rack system having a front plate and a back plate that are slidably connected, wherein the front plate is coupled to the chassis and the back plate is coupled to the helmet block; and
 a pin system having a release button positioned adjacent to a front surface of the front plate and a dowel pin positioned adjacent to a back surface of the back plate, wherein the dowel pin is adapted to engage the back surface in order to keep the chassis stationary, wherein compressing the release button extends the dowel pin away from the back surface so that the chassis can be moved vertically relative to the helmet block.

12. The helmet mount of claim 11 wherein the front plate and back plate are slidably connected in a double dovetail interface, wherein a pair of parallel ridges in the front plate slidably engage a pair of recesses in the back plate.

13. The helmet mount of claim 11 wherein the back surface of the back plate has a plurality of horizontal grooves positioned vertically adjacent each other and adapted to receive a rounded surface of the dowel pin, such that the dowel pin moves within one of the grooves when the dowel pin contacts a surface between adjacent grooves.

14. The helmet mount of claim 11 further comprising an actuator disposed between the front plate and the back plate, and connecting to the release button at a first end and connecting to the dowel pin at a second end opposite the first end, such that compressing the release button in a horizontal direction towards the front surface extends the actuator and the dowel pin an equal distance in the horizontal direction away from the back surface.

15. A helmet mount for a night vision device comprising:

means for securing the helmet mount to a helmet;

means for receiving the night vision device within the helmet mount;

means for vertically adjusting the night vision device relative to a user's eyes while the helmet mount is secured to the helmet and the night vision device is received in the helmet mount wherein the means for securing the helmet mount to the helmet is a helmet block;

the means for receiving the night vision device within the helmet mount is a chassis mounted to a rack system; and the means for vertically adjusting the night vision device relative to the user's eyes comprises:
 the rack system having a front plate and a back plate that are slidably connected, wherein the front plate is coupled to the chassis and the back plate is coupled to the helmet mount; and
 a gear drive system having a lever positioned adjacent to a front surface of the front plate and a gear positioned within a back surface of the back plate, wherein rotating the lever rotates the gear so that the vertical position of the chassis is changed relative to the helmet block.

16. The helmet mount of claim 15 wherein the gear has a plurality of teeth and the back surface of the back plate has a plurality of grooves adapted to engage the teeth.

17. The helmet mount of claim 15 wherein the gear has a rotational range of approximately 120 degrees with the back surface of the back plate.

18. The helmet mount of claim 15 wherein the gear is made of brass.

19. The helmet mount of claim 16 wherein a lubricant is placed over the grooves in the back surface of the back plate to facilitate a fluid movement of the gear when the lever is rotated.

20. The helmet mount of claim 16 wherein an amount of friction to rotate the gear is sufficient to prevent a change in vertical position in the night vision device when a force encountered during ordinary use of the night vision device is applied to the night vision device.

* * * * *